US012722235B2

(12) United States Patent
Chikaguchi et al.

(10) Patent No.: US 12,722,235 B2
(45) Date of Patent: Sep. 1, 2026

(54) TRAJECTORY PLAN CREATION ASSISTANCE METHOD, TRAJECTORY PLAN CREATION ASSISTANCE DEVICE, ADDITIVE MANUFACTURING METHOD, ADDITIVE MANUFACTURING DEVICE, AND PROGRAM

(71) Applicant: KABUSHIKI KAISHA KOBE SEIKO SHO (KOBE STEEL, LTD.), Hyogo (JP)

(72) Inventors: Satoshi Chikaguchi, Kobe (JP); Shuo Huang, Kobe (JP)

(73) Assignee: KABUSHIKI KAISHA KOBE SEIKO SHO (KOBE STEEL, LTD.), Hyogo (JP)

( * ) Notice: Subject to any disclaimer, the term of this patent is extended or adjusted under 35 U.S.C. 154(b) by 407 days.

(21) Appl. No.: 18/684,445

(22) PCT Filed: Jul. 20, 2022

(86) PCT No.: PCT/JP2022/028276
§ 371 (c)(1),
(2) Date: Feb. 16, 2024

(87) PCT Pub. No.: WO2023/021914
PCT Pub. Date: Feb. 23, 2023

(65) Prior Publication Data

US 2025/0144752 A1 May 8, 2025

(30) Foreign Application Priority Data

Aug. 20, 2021 (JP) ................................ 2021-135179
Mar. 16, 2022 (JP) ................................ 2022-041225

(51) Int. Cl.
*B33Y 10/00* (2015.01)
*B23K 37/02* (2006.01)
(Continued)

(52) U.S. Cl.
CPC ................................ *B23K 37/0258* (2013.01)

(58) Field of Classification Search
CPC .......... B22F 10/22; B22F 10/85; B33Y 10/00; B33Y 30/00; B33Y 50/02; B23K 9/044
See application file for complete search history.

(56) References Cited

U.S. PATENT DOCUMENTS

2013/0182070 A1* 7/2013 Peters ...................... G09B 5/02 348/43
2021/0114112 A1 4/2021 Yamasaki et al.
(Continued)

FOREIGN PATENT DOCUMENTS

EP 2176805 B1 * 11/2019 ......... G05B 19/4099
JP 2018-027558 A 2/2018
(Continued)

OTHER PUBLICATIONS

International Search Report issued in PCT/JP2022/028276; mailed Aug. 30, 2022.
(Continued)

*Primary Examiner* — Mark A Connolly
(74) *Attorney, Agent, or Firm* — Studebaker Brackett PLLC

(57) ABSTRACT

A trajectory plan creation assistance method for assisting creation of a trajectory plan acquires shape data of the manufacturing object, decomposes a three-dimensional shape model based on the shape data into a plurality of linear models each having a polygonal vertical cross section in a longitudinal direction, sets a bead formation locus for forming the weld bead along the linear model and the bead formation trajectory including a lamination order of the weld bead, generates a plurality of polygonal columnar unit blocks by dividing the linear model into unit lengths along the set bead formation locus, and creates the trajectory plan
(Continued)

by simulating the formation of the weld bead for each of the unit blocks by simulation.

20 Claims, 26 Drawing Sheets

(51) Int. Cl.

| | |
|---|---|
| ***B33Y 30/00*** | (2015.01) |
| ***B33Y 50/02*** | (2015.01) |

(56) References Cited

U.S. PATENT DOCUMENTS

| | | | | |
|---|---|---|---|---|
| 2021/0283857 | A1* | 9/2021 | Clark .................... | B33Y 40/20 |
| 2022/0355407 | A1 | 11/2022 | Fujii et al. | |

FOREIGN PATENT DOCUMENTS

| | | | | |
|---|---|---|---|---|
| WO | WO-2015128729 | A1 * | 9/2015 | ............ G09B 19/24 |
| WO | 2020/262291 | A1 | 12/2020 | |

OTHER PUBLICATIONS

Extended European Search Report issued in EP 22 85 8236.7-1201 by the European Patent Office on Oct. 14, 2024, which is related to U.S. Appl. No. 18/684,445.

Shen Yonghua et al., "A path generation method for wire and arc additive remanufacturing of complex hot forging dies", The International Journal of Advanced Manufacturing Technology, Springer, London, vol. 117, No. 5-6, Aug. 13, 2021 (Aug. 13, 2021), pp. 1935-1943, XP037591719, ISSN: 0268-3768, DOI: 10.1007/S00170-021-07813-W.

* cited by examiner 100
13A
33
DISPLAY UNIT
36
EXTERNAL PC
31
INPUT UNIT
NETWORK
13
33
DISPLAY UNIT
35
PC
31
INPUT UNIT
WELDING POWER SUPPLY UNIT
25
ROBOT DRIVING UNIT
21
23
27
11
17
M
15
29
B
W PL
UBb
BM2a
BM2
BM2b
UBa
BM1a
BM1
BM1b
P6b
P6
P6a
P5b
P5
P5a
P3b
P3
P3a
P2b
P2
P2a
P7b
P7
P7a
P4b
P4
P4a
P1b
P1
P1a
PS2
PS1

| | SHAPE OF UNIT BLOCK | APPLICATION LOCATION |
|---|---|---|
| UB1 |  |  |
| UB2 |  |  |
| UB3 |  |  |
| UB4 |  |  |
| UB5 |  |  |
| UB6 |  | BEAD<br>START PART AND END PART |

PL
UBc
BM3a
BM3
BM3b
UBa
BM1a
BM1
BM1b
P7b
P7
P6b
P7a
P6
P3b
P6a
P3
P3a
P2b
P5b
P2
P5
P2a
P5a
P8b
P8
P8a
P4b
P4
P4a
P1b
P1
P1a
PS2
PS1

TRAJECTORY PLAN CREATION ASSISTANCE METHOD, TRAJECTORY PLAN CREATION ASSISTANCE DEVICE, ADDITIVE MANUFACTURING METHOD, ADDITIVE MANUFACTURING DEVICE, AND PROGRAM

TECHNICAL FIELD

The present invention relates to a trajectory plan creation assistance method, a trajectory plan creation assistance device, an additive manufacturing method, an additive manufacturing device, and a program.

BACKGROUND ART

In recent years, needs for manufacturing using a 3D printer as a means of production are increased, and research and development have been carried out toward a practical use of manufacturing using metal materials. As a technique for producing a three-dimensional manufacturing object using metal materials, for example, there is a method of laminating weld beads in a desired shape, the weld beads being formed by melting and solidifying a filler metal (welding wire) using a heat source such as an arc.

There is a technique of modeling a cross-sectional shape of the weld beads for the purpose of computer-aided design support or automated control when producing such a manufacturing object (for example, Patent Literature 1). Patent Literature 1 describes that manufacturing conditions are changed using an elliptical shape bead model such that a difference between a target shape of the manufacturing object and a shape predicted from measured value database is equal to or less than an allowable value.

CITATION LIST

Patent Literature

Patent Literature 1: JP2018-27558A

SUMMARY OF INVENTION

Technical Problem

In additive manufacturing, in which the weld beads made by melting and solidifying the filler metal are laminated, complicated three-dimensional shapes are often produced, and a trajectory plan for forming the weld beads is preferably determined using a three-dimensional bead formation path instead of a plan based on two dimensions in the related art. In particular, in order to correctly evaluate an influence of the trajectory of each bead formation path on a manufacturing result, it is essential to make the trajectory plan three-dimensional. However, when the trajectory plan is made three-dimensional, the trajectory plan becomes more complicated than a two-dimensional one, and thus it may become difficult to evaluate the plan per se. In addition, it is considered to finely adjust a shape of a bead model based on formation conditions of the weld beads, but calculation processing becomes complicated, and depending on a scale of the manufacturing object, it is not possible to create a trajectory plan in a realistic time.

Here, an object of the present invention is to provide a trajectory plan creation assistance method, a trajectory plan creation assistance device, an additive manufacturing method, an additive manufacturing device, and a program capable of correctly evaluating a suitability of a trajectory plan of a manufacturing object without requiring a complicated calculation process even when the trajectory plan is expanded from two-dimensional to three-dimensional, thereby creating the trajectory plan in which high reproducibility of the manufacturing object is obtained.

Solution to Problem

The present invention includes the following constitutions.

(1) A trajectory plan creation assistance method for assisting creation of a trajectory plan, the trajectory plan including a bead formation trajectory for forming a weld bead when melting and solidifying a filler metal held by a manipulator while moving the filler metal by the manipulator to form the weld bead and laminating the formed weld bead to produce a manufacturing object, the method comprising:

- acquiring shape data of the manufacturing object;
- decomposing a three-dimensional shape model based on the shape data into a plurality of linear models each having a polygonal vertical cross section in a longitudinal direction;
- setting a bead formation locus for forming the weld bead along the linear model and the bead formation trajectory including a lamination order of the weld bead;
- generating a plurality of polygonal columnar unit blocks obtained by dividing the linear model into unit lengths along the set bead formation locus; and
- creating the trajectory plan by simulating the formation of the weld bead for each of the unit blocks by simulation.

(2) An additive manufacturing method for forming the weld bead based on the trajectory plan determined by the trajectory plan creation assistance method according to (1).

(3) A trajectory plan creation assistance device comprising:

- a control unit configured to create the trajectory plan by the trajectory plan creation assistance method according to (1).

(4) An additive manufacturing device configured to form the weld bead based on the trajectory plan determined by the trajectory plan creation assistance device according to (1).

(5) A program for executing procedures of a trajectory plan creation assistance method for assisting creation of a trajectory plan, the trajectory plan including a bead formation trajectory for forming a weld bead when melting and solidifying a filler metal held by a manipulator while moving the filler metal by the manipulator to form the weld bead and laminating the formed weld bead to produce a manufacturing object, the program causing a computer to execute

- a procedure of acquiring shape data of the manufacturing object;
- a procedure of decomposing a three-dimensional shape model based on the shape data into a plurality of linear models each having a polygonal vertical cross section in a longitudinal direction;
- a procedure of setting a bead formation locus for forming the weld bead along the linear model and the bead formation trajectory including a lamination order of the weld bead;
- a procedure of generating a plurality of polygonal columnar unit blocks obtained by dividing the linear model into unit lengths along the set bead formation locus; and a procedure of creating the trajectory plan by simulating the formation of the weld bead for each of the unit blocks by simulation.

Advantageous Effects of Invention

According to the present invention, it is possible to correctly evaluate a suitability of a trajectory plan of a manufacturing object without requiring a complicated calculation process even when the trajectory plan is expanded from two-dimensional to three-dimensional. Accordingly, it is possible to create the trajectory plan in which high reproducibility of the manufacturing object is obtained.

Figure 5A:
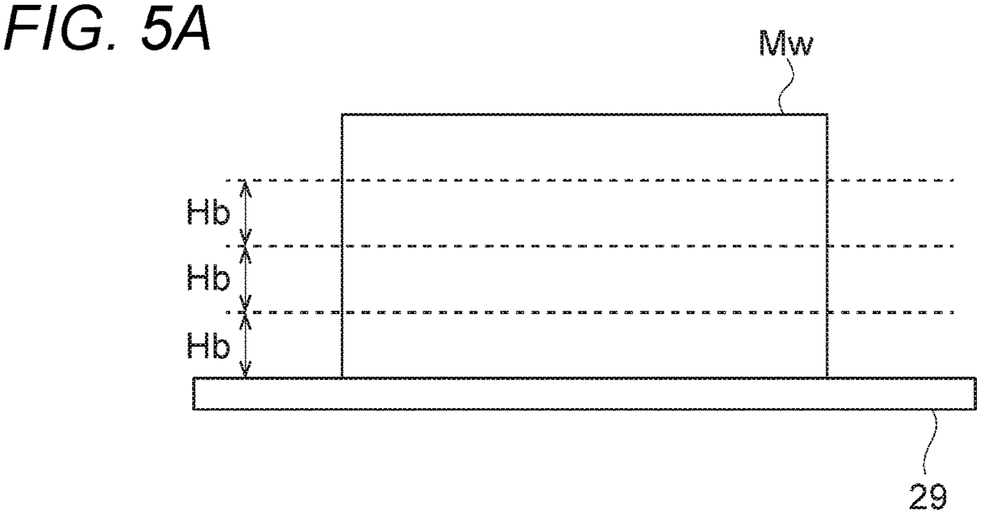
Figure 5B:
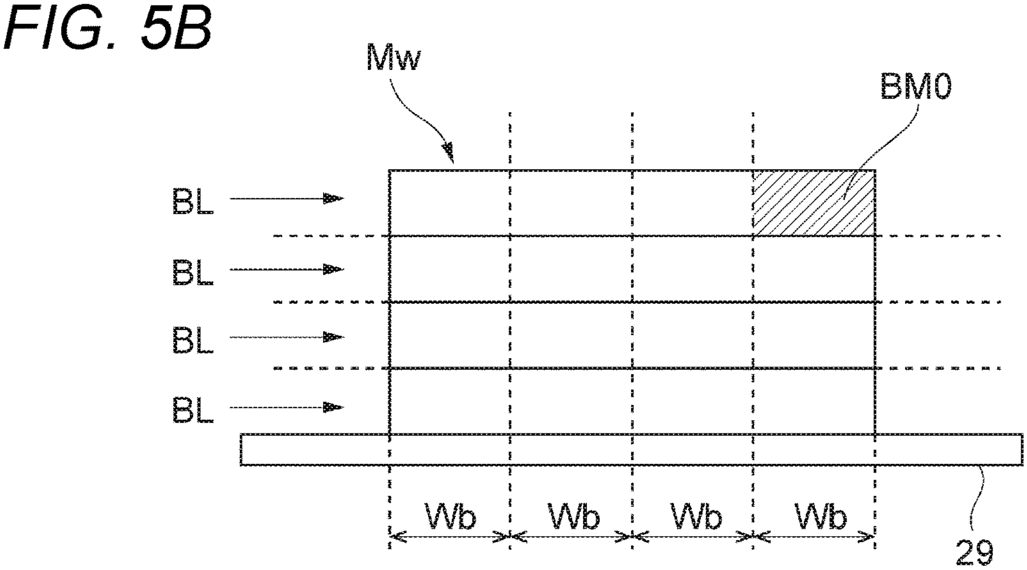
Figure 5C:
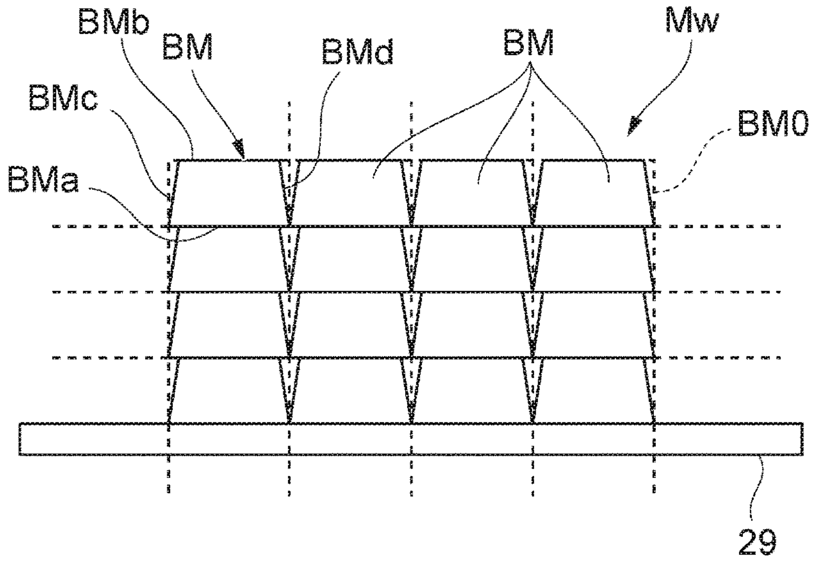

(A) to (C) of FIG. 5 are process explanatory diagrams illustrating a state in which a three-dimensional shape model of the manufacturing object is decomposed into bead models in a stepwise manner.

Figure 6:
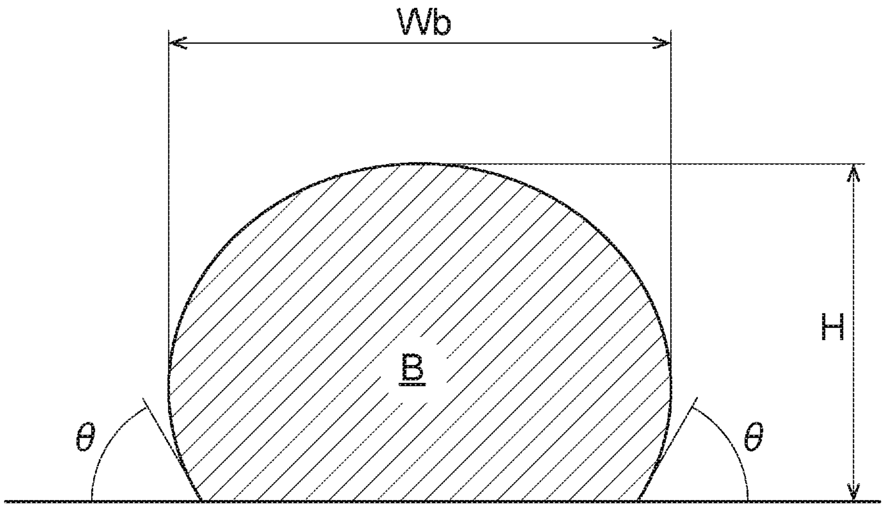

FIG. 6 is a schematic view illustrating a shape and a dimension of the formed weld bead.

Figure 7:
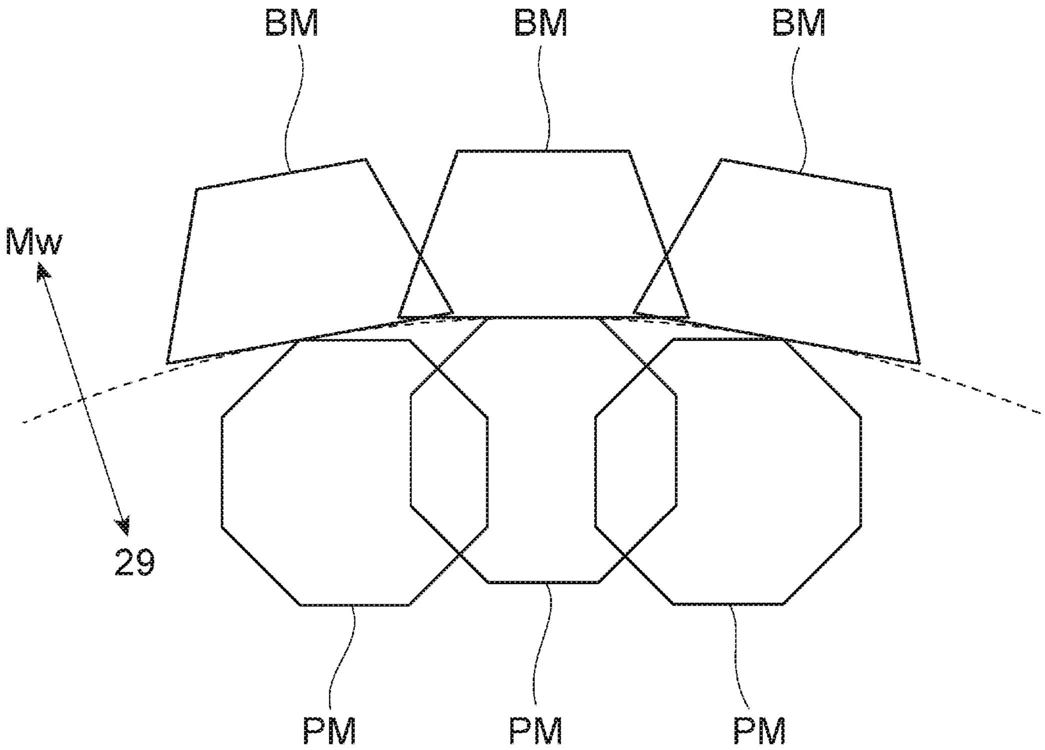

FIG. 7 is an explanatory diagram illustrating a case where a model of a base metal is a linear model having a cross-sectional shape different from that of the manufactured body.

Figure 8A:
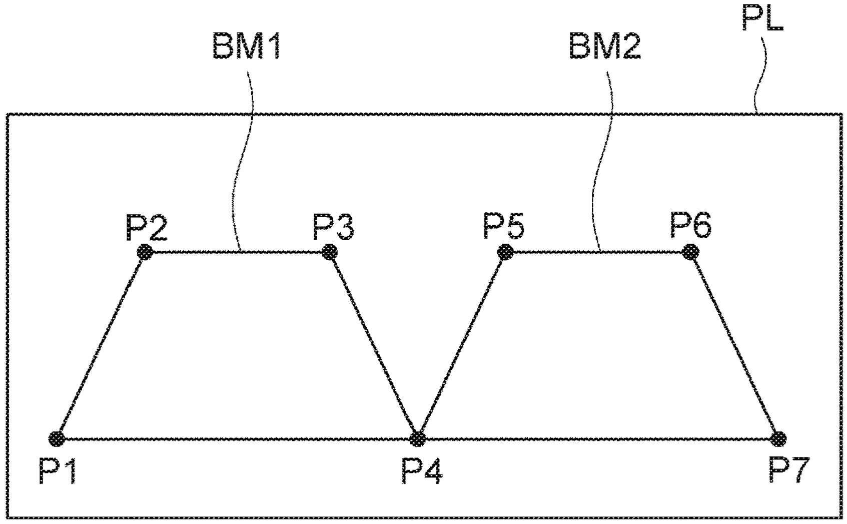

FIG. 8A is a diagram illustrating a unit block based on a trapezoidal bead model and is an explanatory diagram illustrating a cross section of the unit block.

Figure 8B:
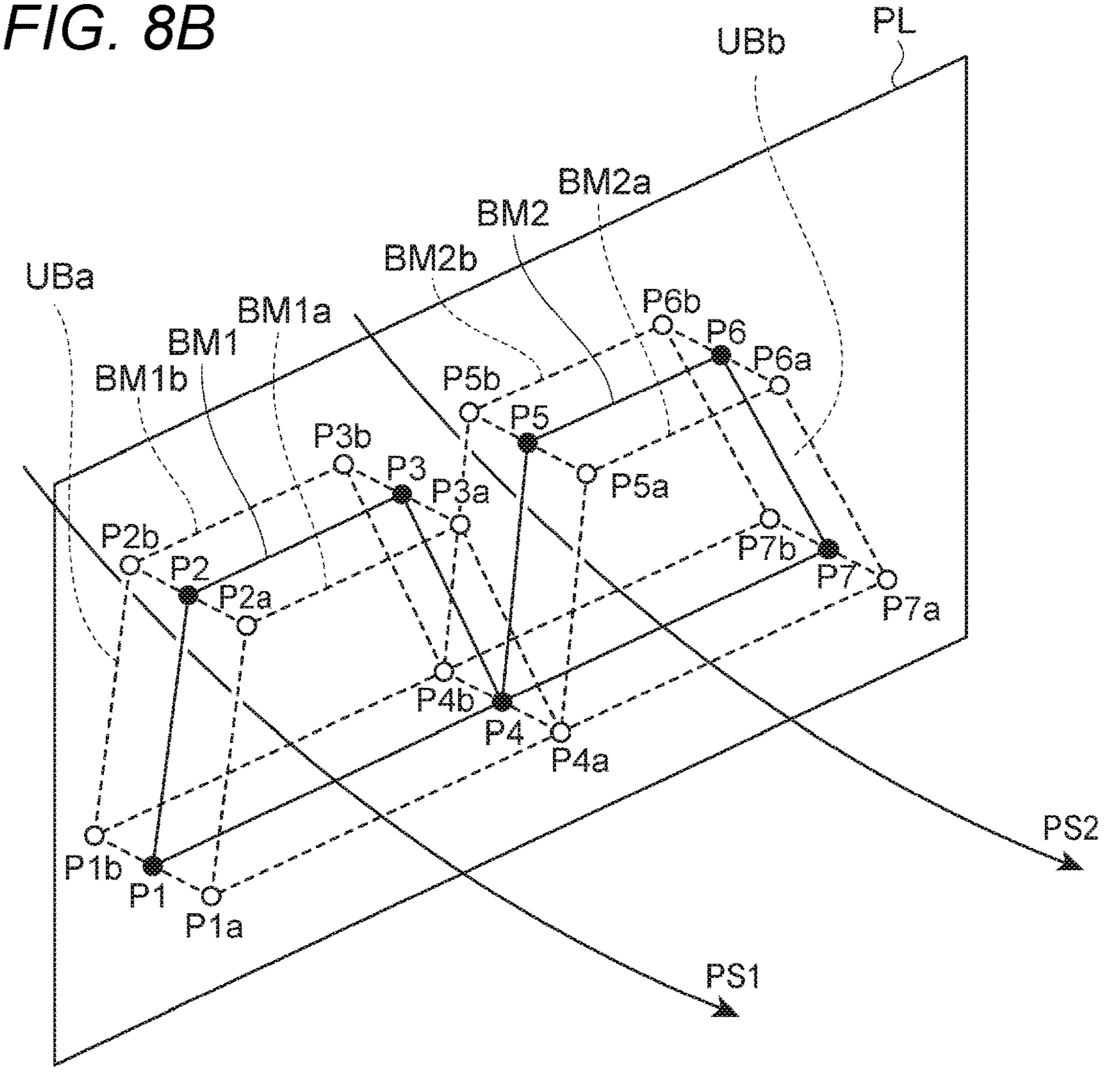

FIG. 8B is a diagram illustrating the unit block based on the trapezoidal bead model and is an explanatory diagram illustrating the unit block along a bead formation locus.

Figure 9:
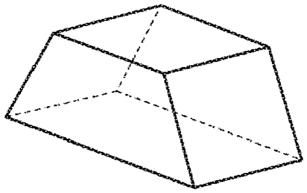
Figure 9:
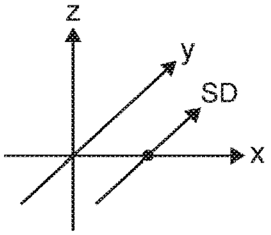
Figure 9:
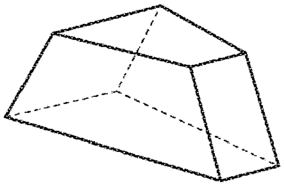
Figure 9:
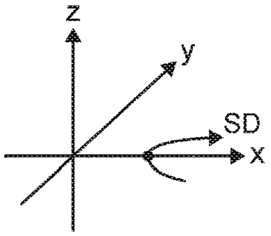
Figure 9:
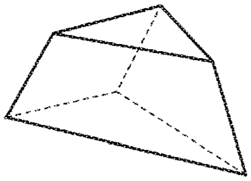
Figure 9:
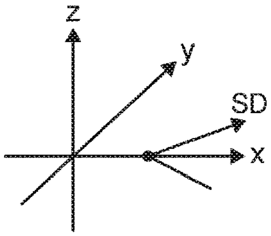
Figure 9:
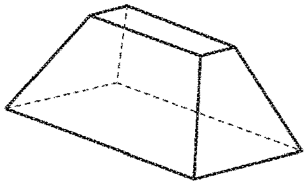
Figure 9:
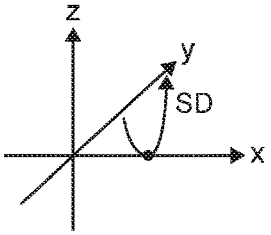
Figure 9:
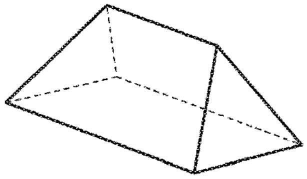
Figure 9:
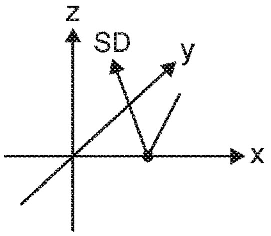
Figure 9:
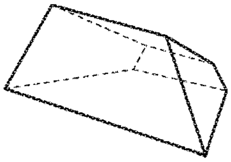

FIG. 9 is an explanatory diagram illustrating shapes of various unit blocks and application locations thereof.

Figure 10:
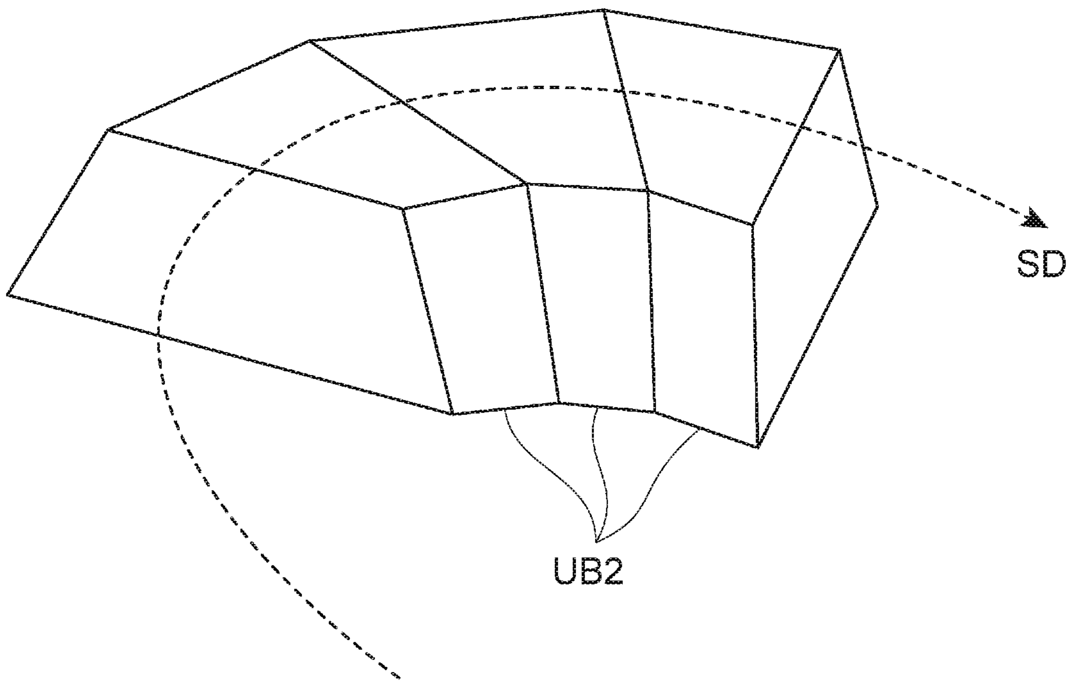

FIG. 10 is a schematic diagram illustrating a state in which the unit blocks are arranged.

Figure 11:
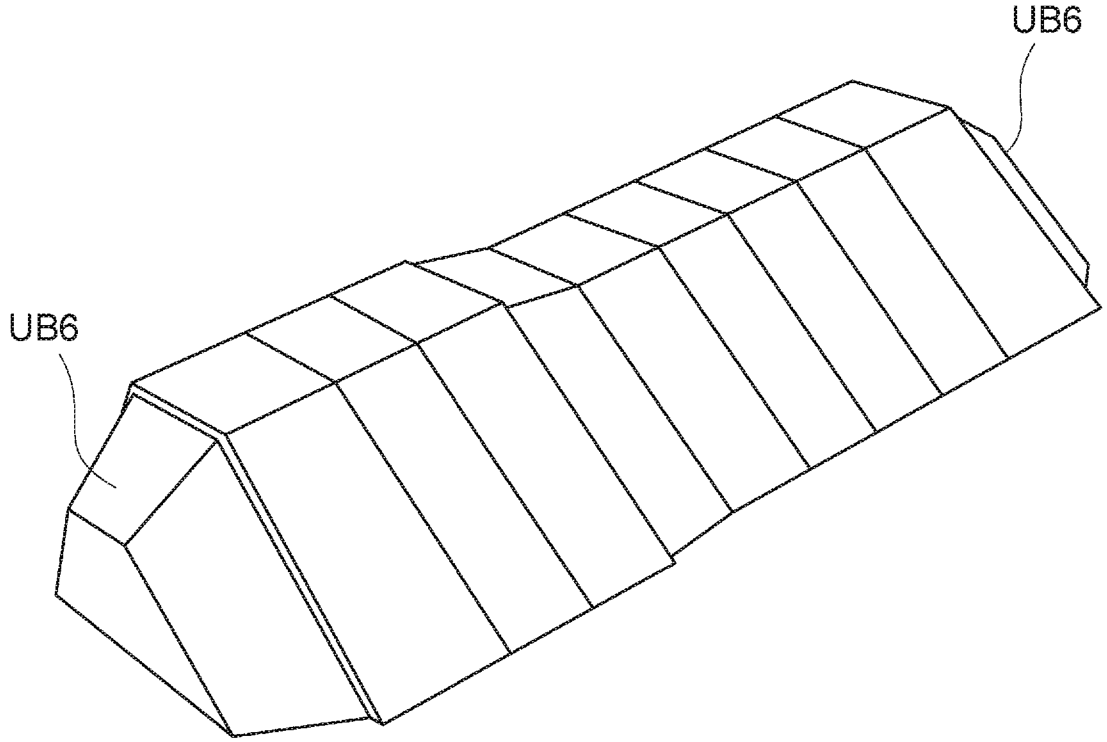

FIG. 11 is a perspective view of a bead model illustrating a state in which the unit blocks are arranged at a start part or an end part of the weld bead.

Figure 12:
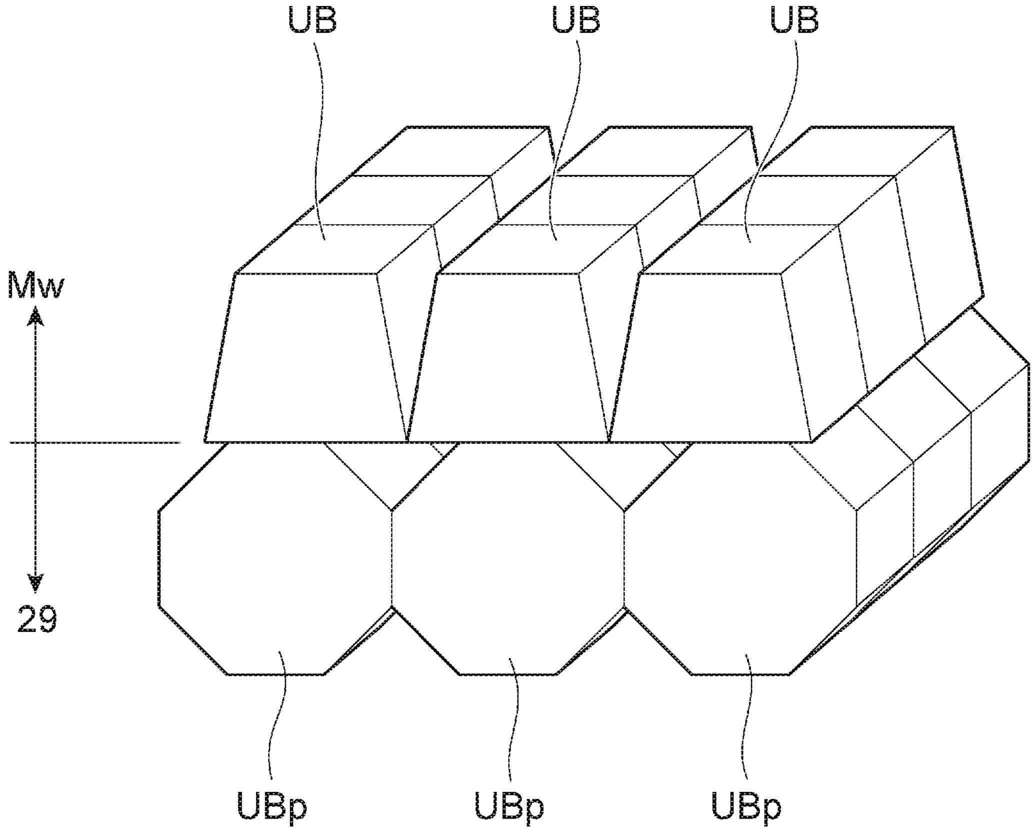

FIG. 12 is an explanatory diagram illustrating unit blocks of the manufacturing object and unit blocks of the base metal and the linear model.

Figure 13:
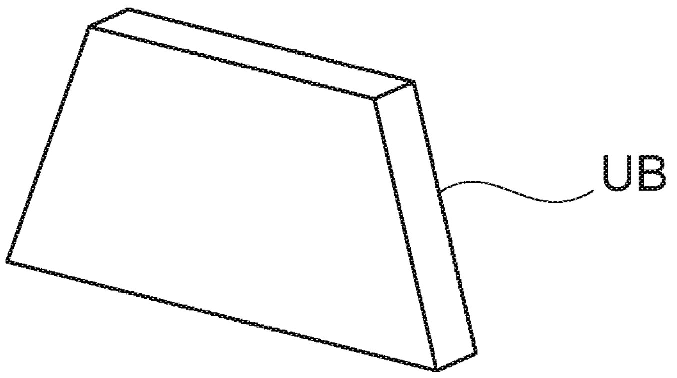

FIG. 13 is a schematic perspective view of the unit block illustrated as an example.

Figure 14:
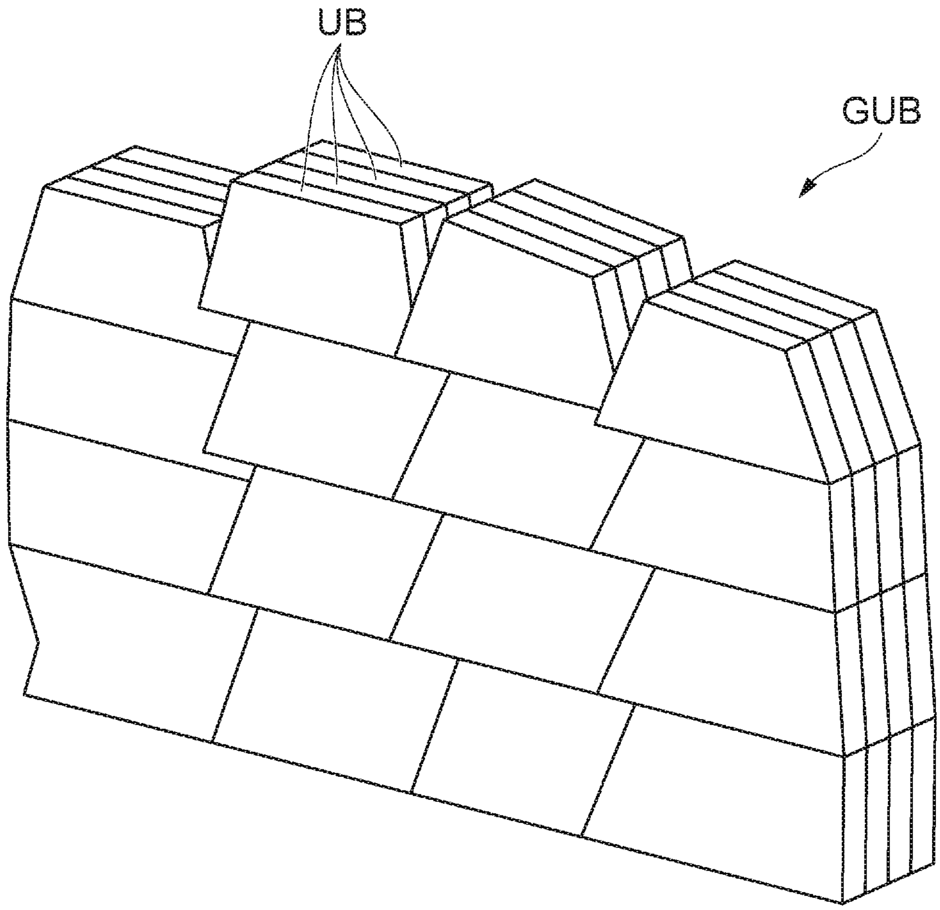

FIG. 14 is a schematic perspective view illustrating a unit block group in which the unit blocks are arranged along a bead lamination order and a bead formation trajectory.

Figure 15:
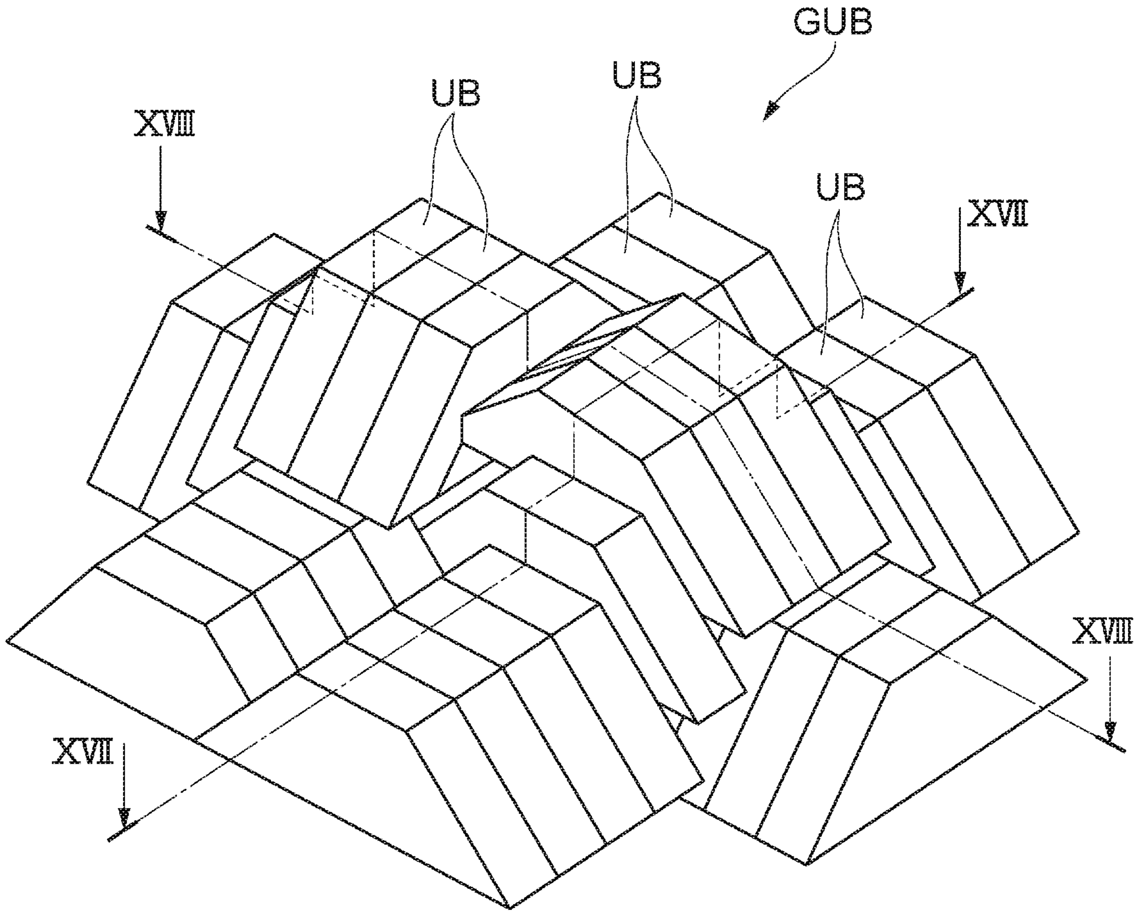

FIG. 15 is a schematic perspective view illustrating the unit block group in which the unit blocks are arranged along a bead lamination order and a bead formation trajectory.

Figure 16A:
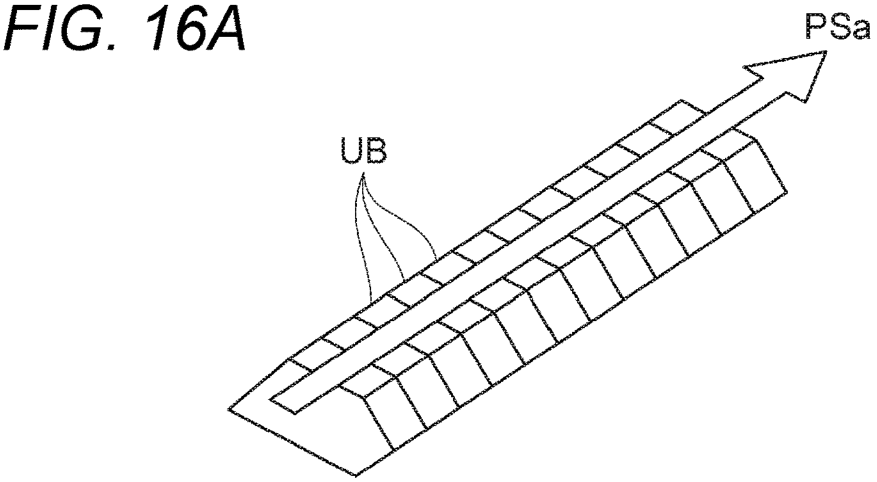

FIG. 16A is an explanatory diagram illustrating an arrangement order of the unit blocks in the unit block group illustrated in FIG. 15 in stages.

Figure 16B:
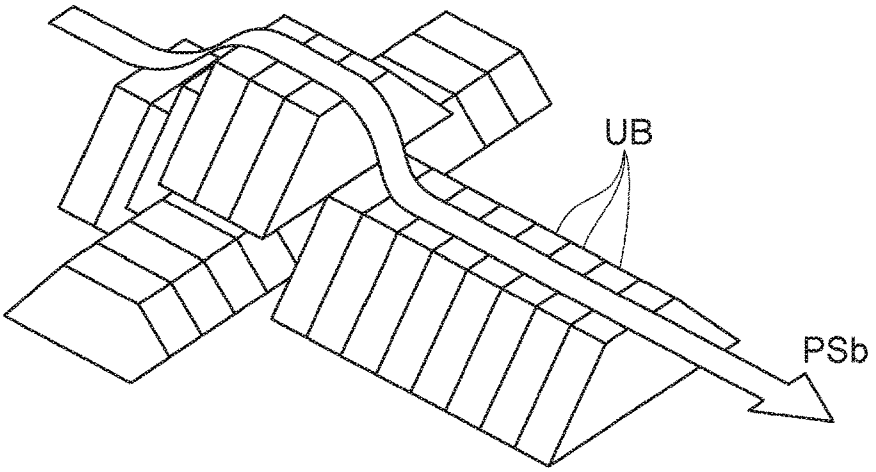

FIG. 16B is an explanatory diagram illustrating the arrangement order of the unit blocks in the unit block group illustrated in FIG. 15 in stages.

Figure 16C:
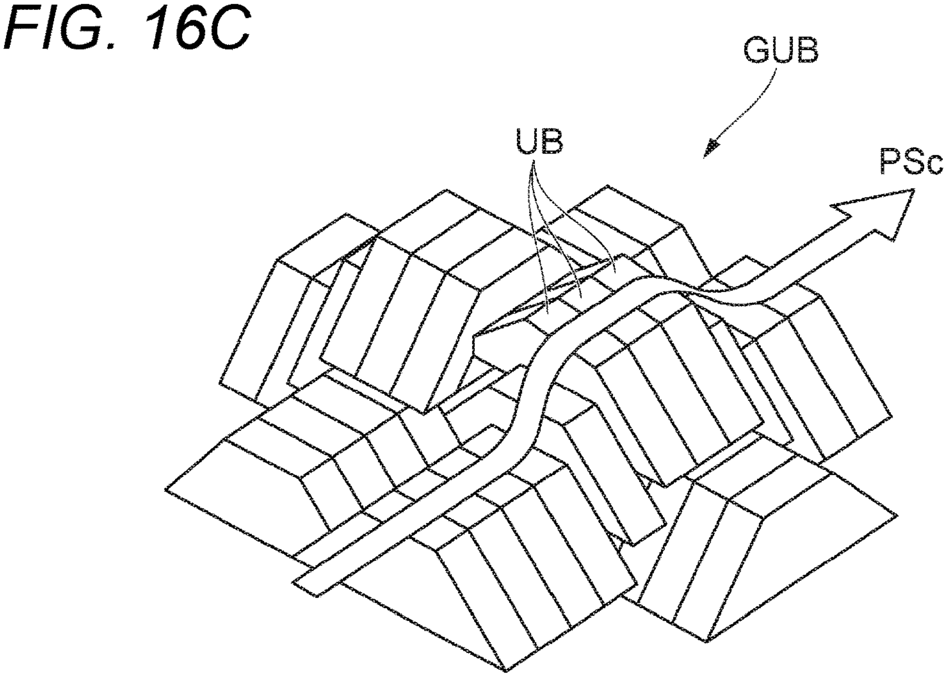

FIG. 16C is an explanatory diagram illustrating the arrangement order of the unit blocks in the unit block group illustrated in FIG. 15 in stages.

Figure 17:
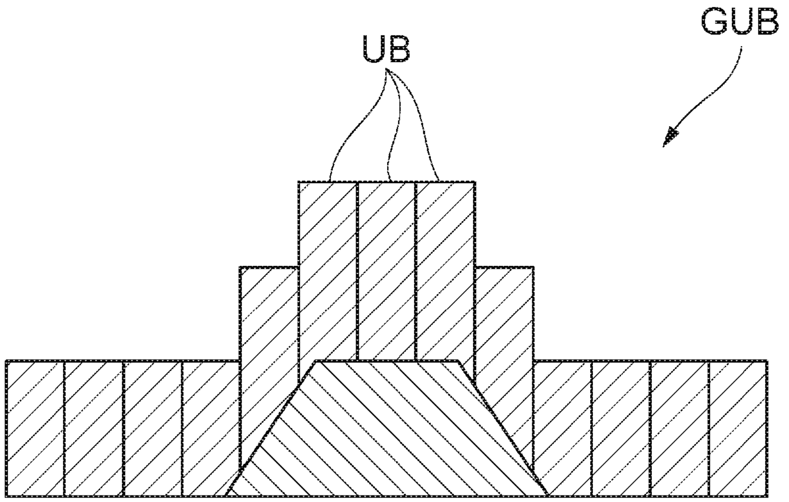

FIG. 17 is a cross-sectional view taken along line XVII-XVII of the unit block group illustrated in FIG. 15.

Figure 18:
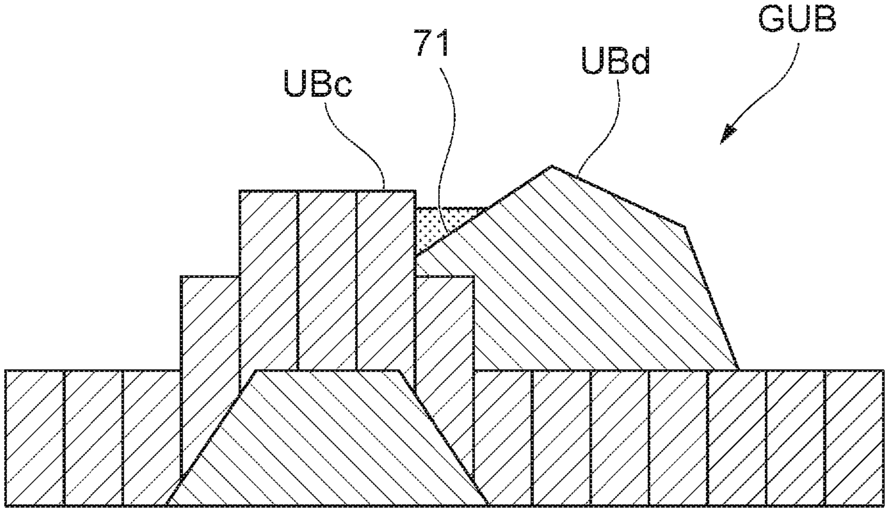

FIG. 18 is a cross-sectional view taken along line XVIII-XVIII of the unit block group illustrated in FIG. 15.

Figure 19A:
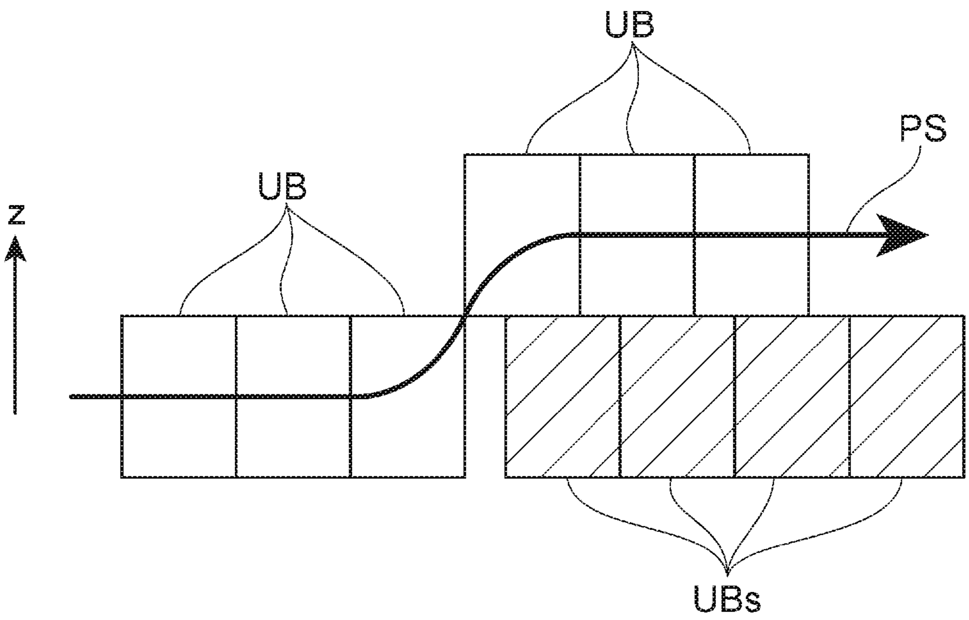

FIG. 19A is a diagram illustrating a difference in an arrangement form of a plurality of unit blocks and is an explanatory diagram illustrating an arrangement form having a step.

Figure 19B:
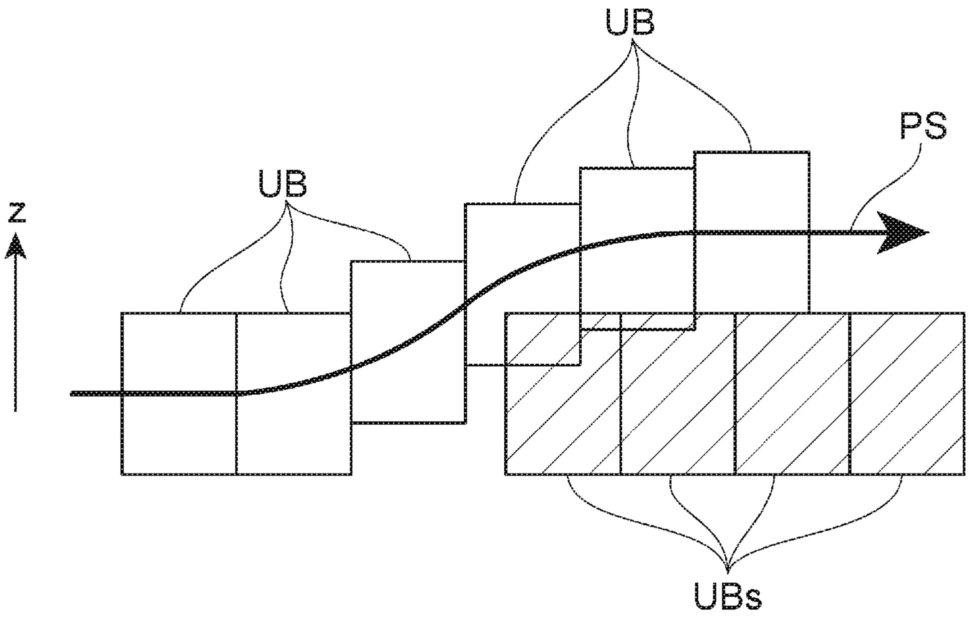

FIG. 19B is a diagram illustrating a difference in an arrangement form of a plurality of unit blocks and is an explanatory diagram illustrating a smoothed arrangement form.

Figure 20A:
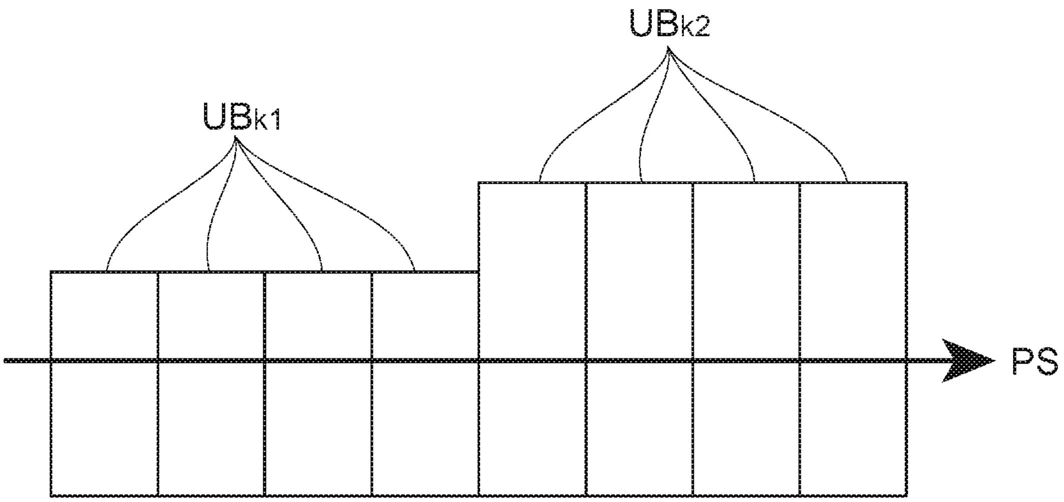

FIG. 20A is a diagram illustrating a difference in an arrangement form of a plurality of unit blocks and is an explanatory diagram illustrating an arrangement form having a step.

Figure 20B:
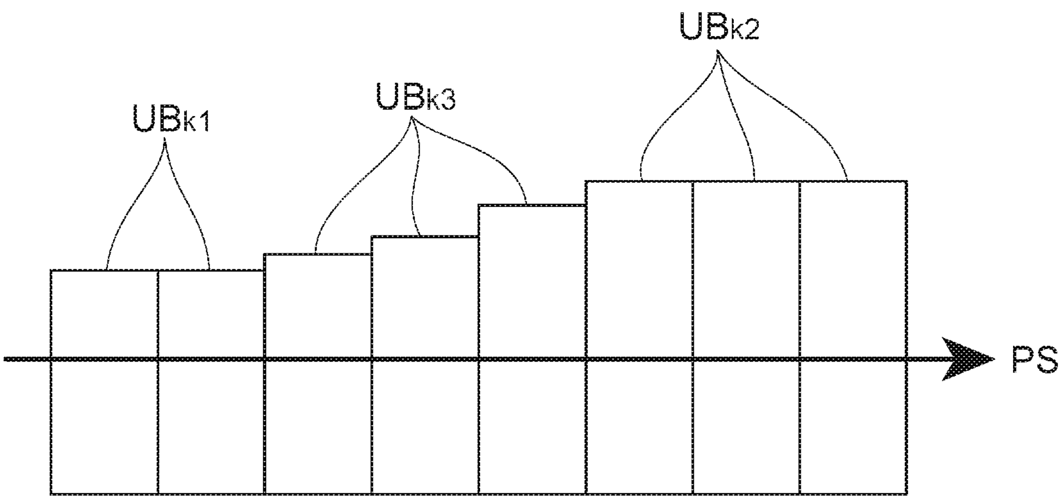

FIG. 20B is a diagram illustrating a difference in an arrangement form of a plurality of unit blocks and is an explanatory diagram illustrating a smoothed arrangement form.

Figure 21A:
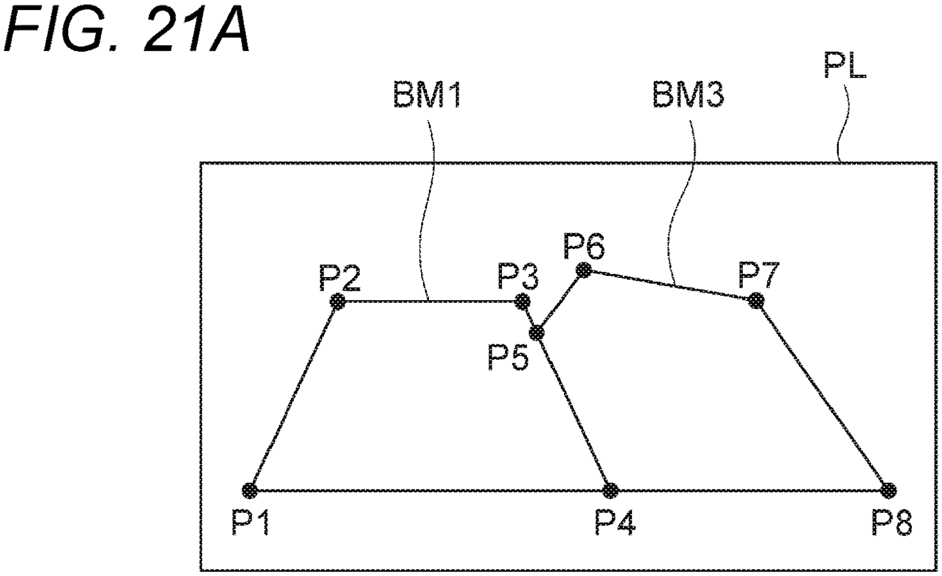

FIG. 21A is a diagram illustrating a unit block based on a trapezoidal bead model and a pentagonal bead model and is an explanatory diagram illustrating a cross section of the unit block.

Figure 21B:
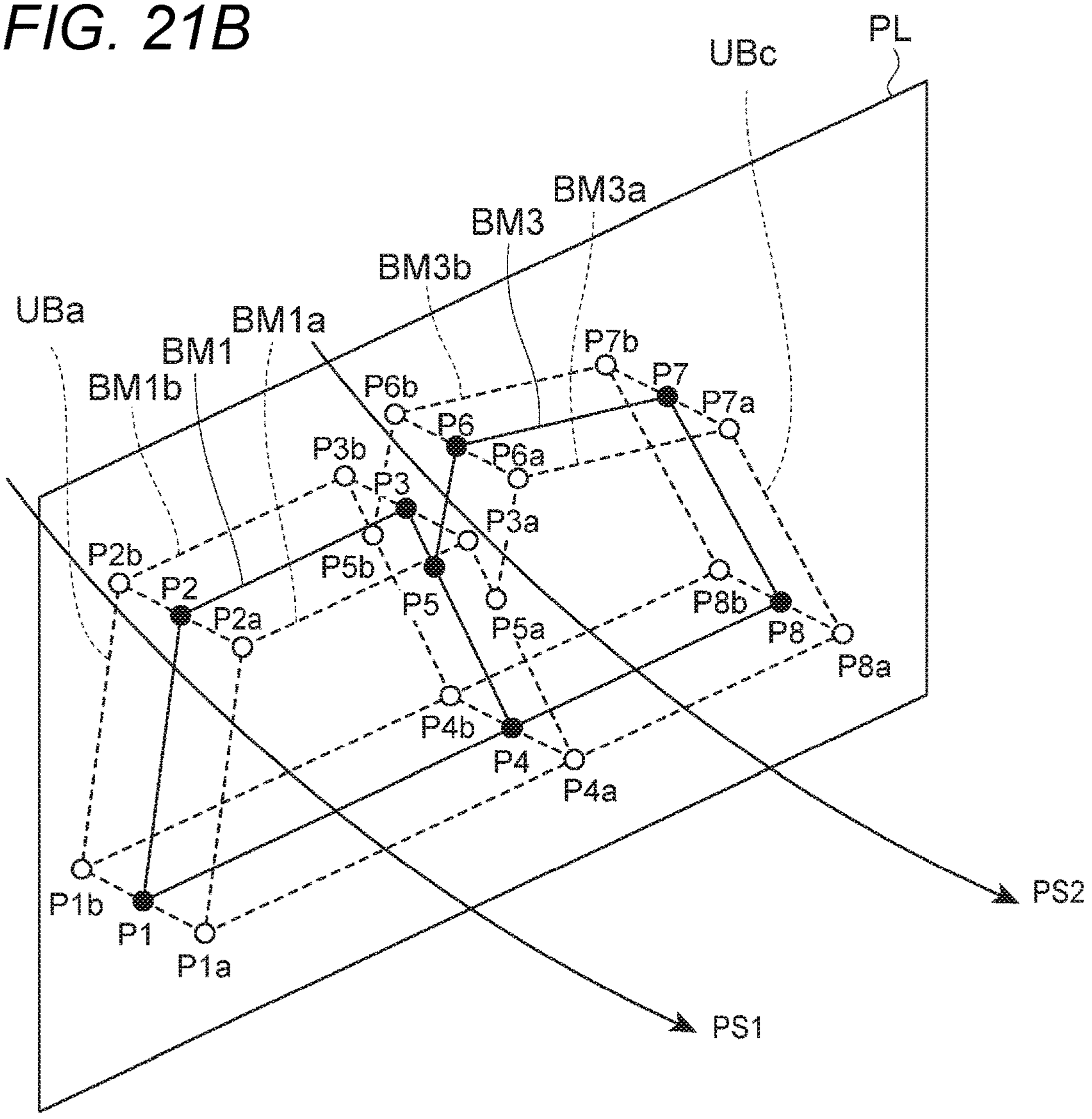

FIG. 21B is a diagram illustrating the unit block based on the trapezoidal bead model and the pentagonal bead model and is an explanatory diagram illustrating the unit block along the bead formation locus.

Figure 22A:
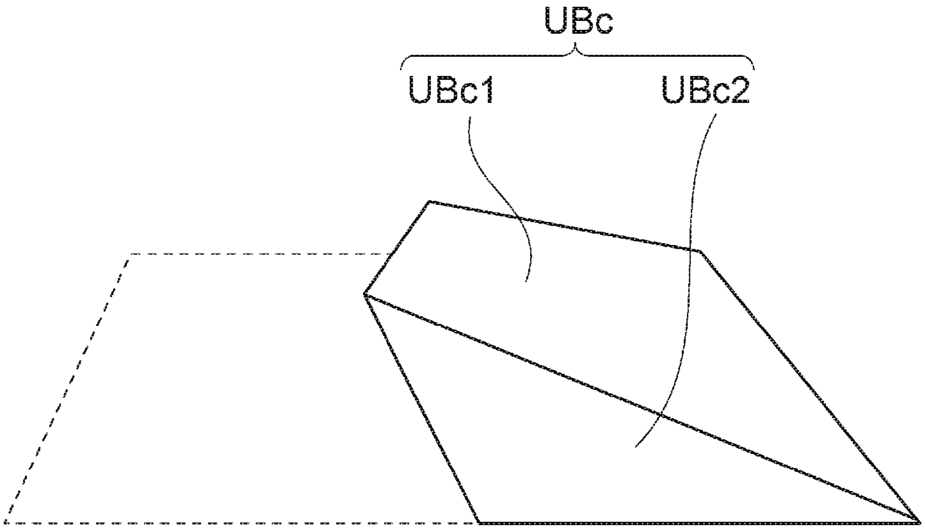

FIG. 22A is a diagram illustrating a division form of the unit block illustrated in FIGS. 21A and 21B and is a front view of the unit block.

Figure 22B:
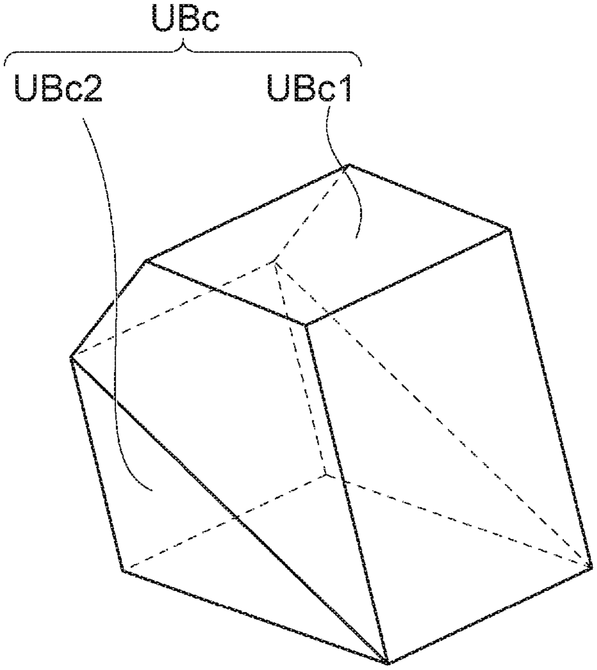

FIG. 22B is a diagram illustrating the division form of the unit block illustrated in FIGS. 21A and 21B and is a perspective view of the unit block.

Figure 23A:
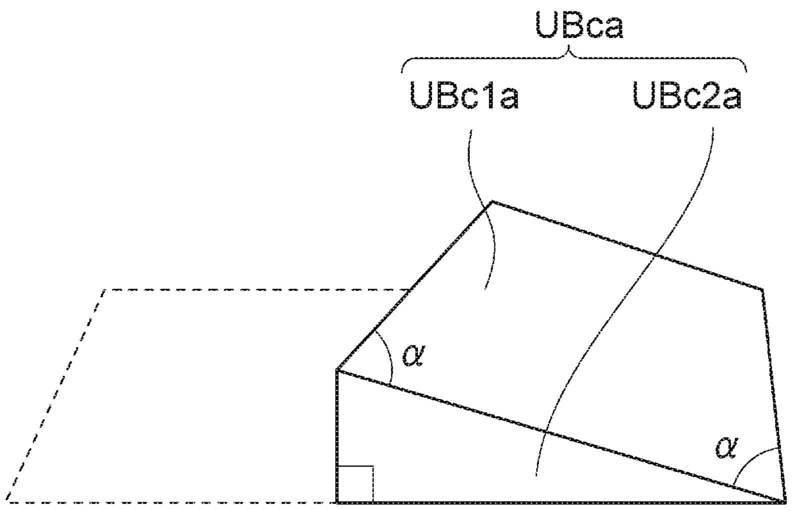

FIG. 23A is a diagram illustrating a division form of another unit block and is a front view of the unit block.

FIG. 23A is a diagram illustrating the division form of another unit block and is a perspective view of the unit block.

Figure 24A:
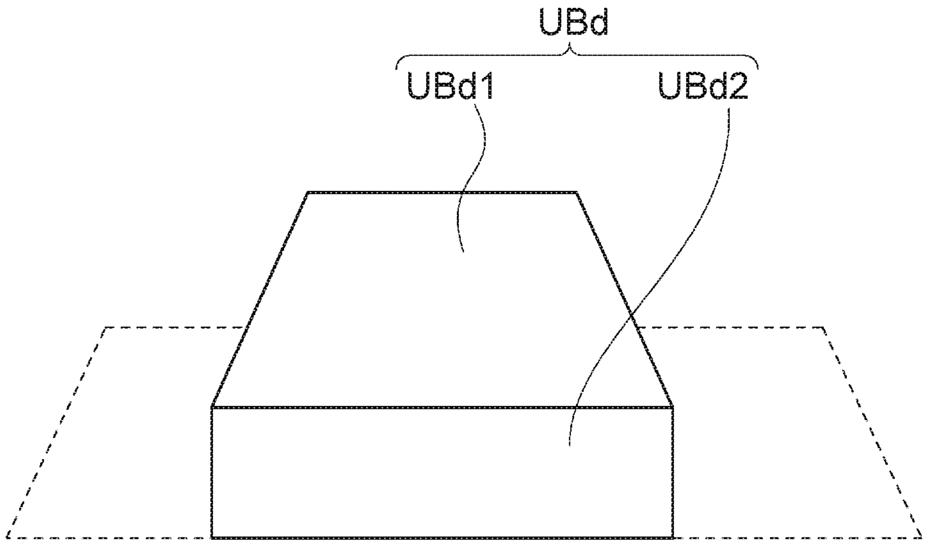

FIG. 24A is a diagram illustrating a division form of an octahedral unit block and is a front view of the unit block.

Figure 24B:
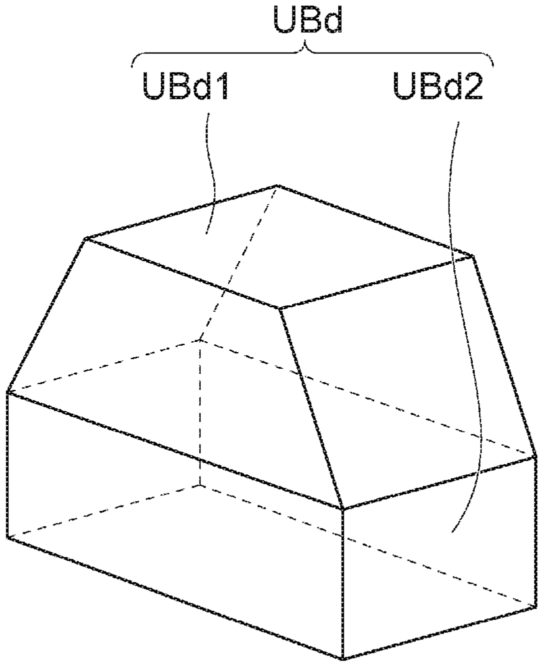

FIG. 24B is a diagram illustrating the division form of the octahedral unit block and is a perspective view of the unit block.

Figure 25A:
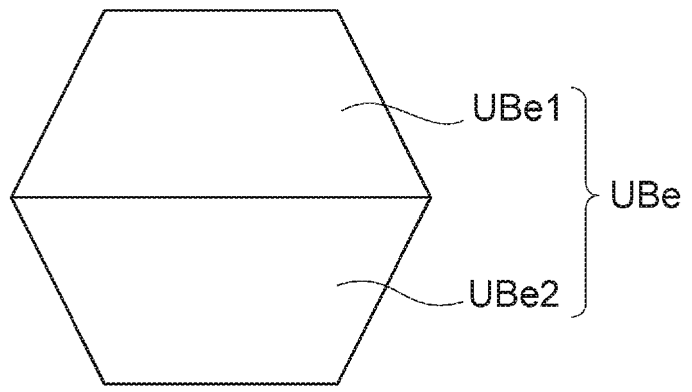

FIG. 25A is a diagram illustrating a division form of an octahedral unit block and is a front view of the unit block.

Figure 25B:
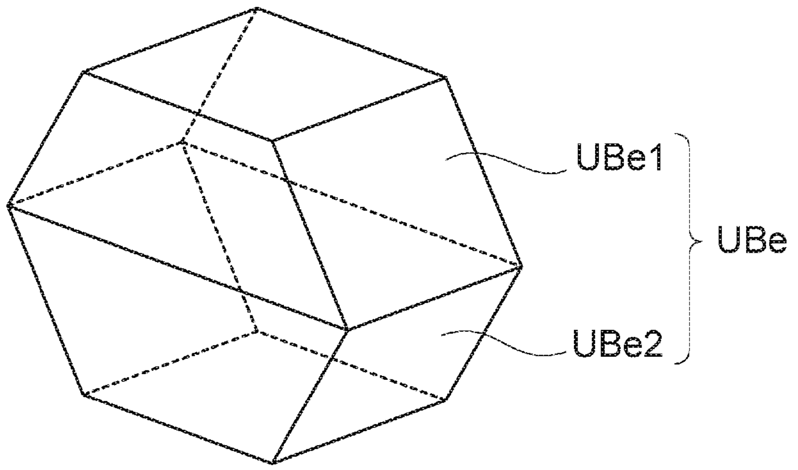

FIG. 25B is a diagram illustrating the division form of the octahedral unit block and is a perspective view of the unit block.

Figure 26A:
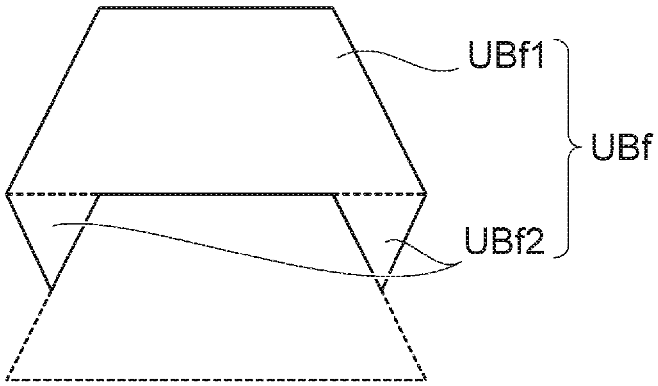

FIG. 26A is a diagram illustrating a division form of a unit block having a dripping portion and is a front view of the unit block.

Figure 26B:
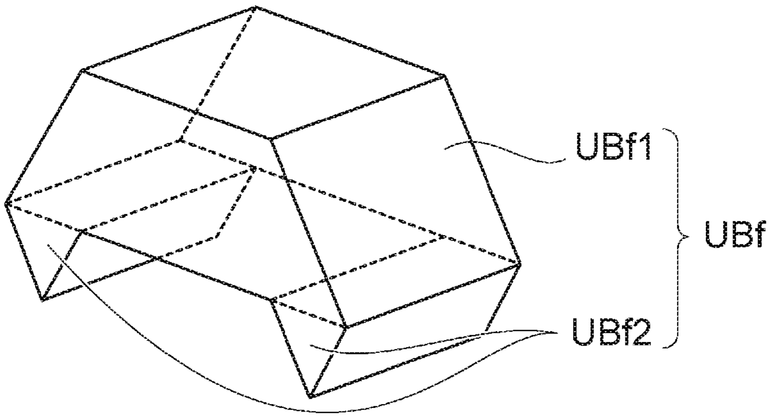

FIG. 26B is a diagram illustrating the division form of the unit block having the dripping portion and is a perspective view of the unit block.

Figure 27A:
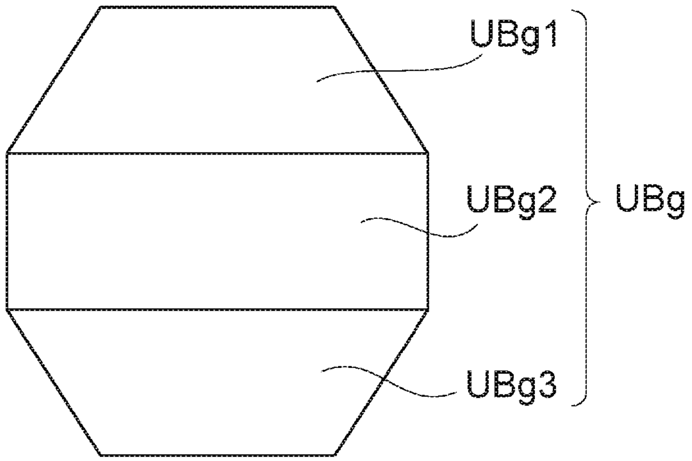

FIG. 27A is a diagram illustrating a division form of a decahedral unit block and is a front view of the unit block.

Figure 27B:
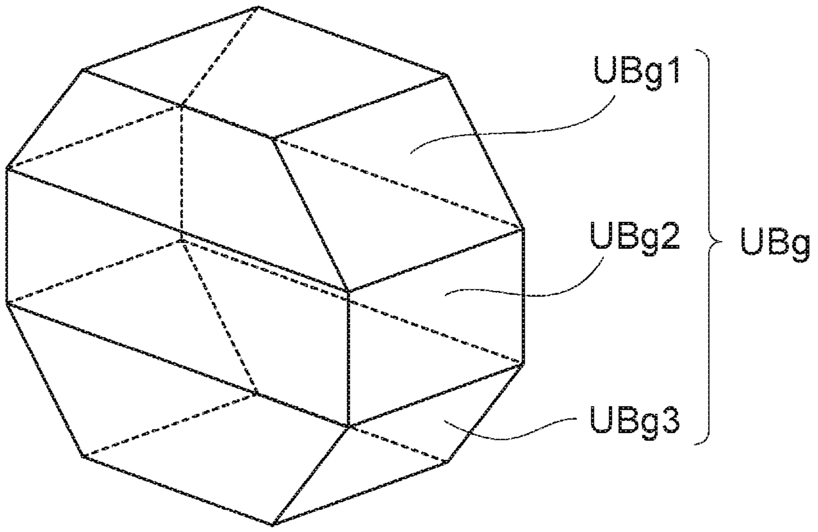

FIG. 27B is a diagram illustrating the division form of the decahedral unit block and is a perspective view of the unit block.

Figure 28A:
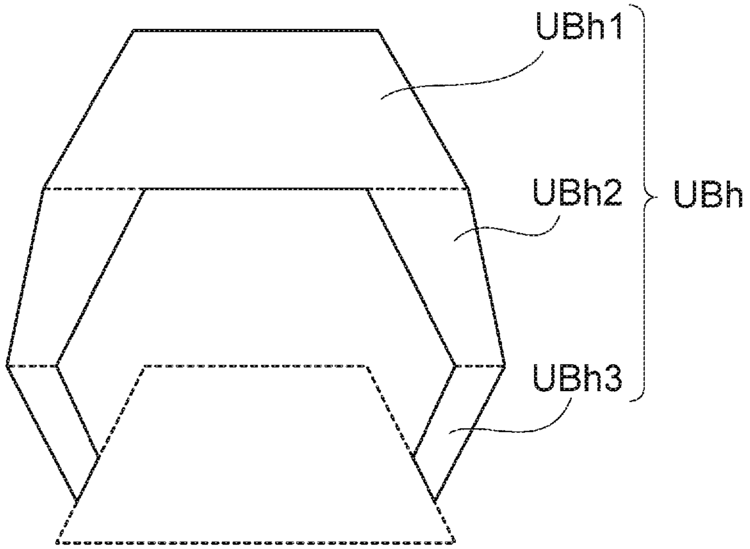

FIG. 28A is a diagram illustrating a division form of a unit block having a dripping portion and is a front view of the unit block.

Figure 28B:
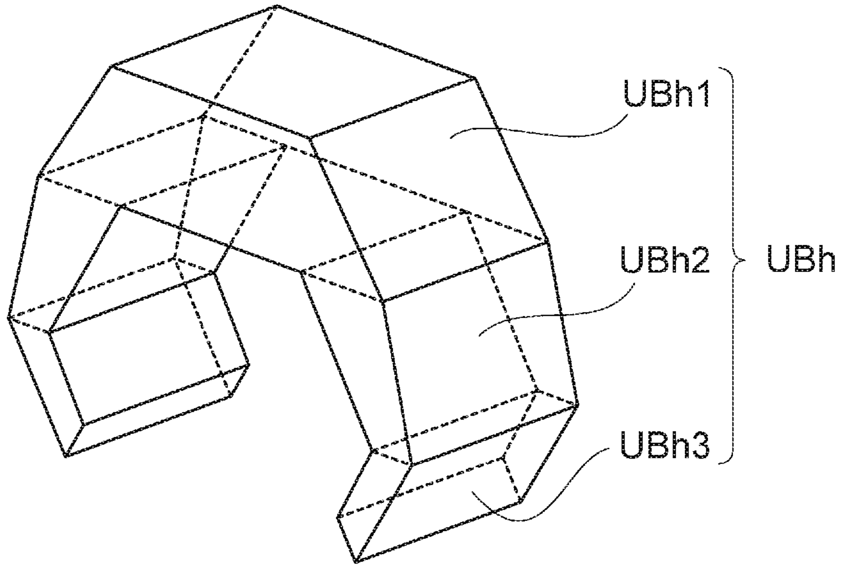

FIG. 28B is a diagram illustrating the division form of the unit block having the dripping portion and is a perspective view of the unit block.

DESCRIPTION OF EMBODIMENTS

Hereinafter, embodiments of the present invention will be described in detail with reference to the drawings.

Here, a case where a three-dimensional manufacturing object is manufactured by laminating a weld bead formed by melting and solidifying a filler metal by arc discharge in a desired shape will be described as an example, and a manufacturing method and a configuration of a manufacturing device are not limited thereto.

<Configuration of Additive Manufacturing Device>

Figure 1:
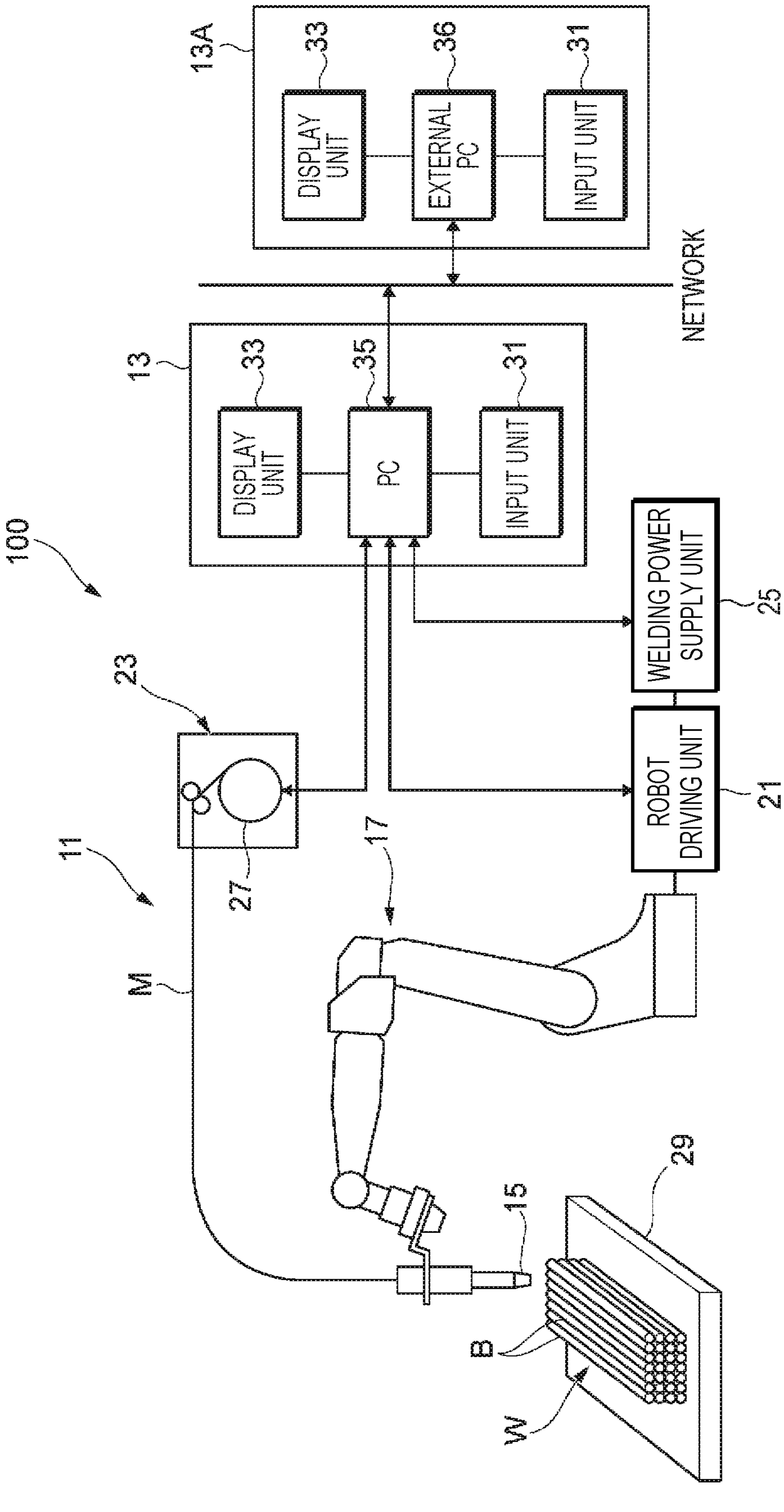
FIG. 1 is an overall configuration diagram of an additive manufacturing device.

FIG. 1 is an overall configuration diagram of an additive manufacturing device 100. The additive manufacturing device 100 includes a manufacturing unit 11 that forms weld beads B and a control unit 13 that controls the manufacturing unit 11.

The manufacturing unit 11 includes a welding robot 17, which is a manipulator, having a welding torch 15 on a tip shaft thereof, a robot driving unit 21 that drives the welding robot 17, a filler metal supply unit 23 that supplies a filler metal (welding wire) M to the welding torch 15, and a welding power supply unit 25 that supplies a welding current.

(Manufacturing Unit)

The welding robot 17 is an articulated robot, and the continuously supplied filler metal M is supported at a tip of the welding torch 15 attached to the tip shaft of a robot arm. A position and a posture of the welding torch 15 can be set three-dimensionally and freely within a range of a degree of freedom of the robot arm according to a command from the robot driving unit 21.

The welding torch 15 is a gas metal arc welding torch that has a shield nozzle (not illustrated) and is supplied with shield gas from the shield nozzle. An arc welding method may be a consumable electrode-based method such as shielded metal arc welding method or carbon dioxide gas arc welding method, or a non-consumable electrode-based method such as TIG welding method or plasma arc welding method, and is appropriately selected depending on the manufacturing object to be produced. For example, in the case of the consumable electrode-based method, a contact tip is disposed inside the shield nozzle, and the contact tip holds the filler metal M to which a melting current is supplied. The welding torch 15 generates an arc from a tip of the filler metal M in a shield gas atmosphere while holding the filler metal M.

The filler metal supply unit 23 includes a reel 27 around which the filler metal M is wound. The filler metal M is fed from the filler metal supply unit 23 to a feeding mechanism (not illustrated) attached to the robot arm or the like, and is fed to the welding torch 15 while being fed forward and backward by the feeding mechanism as necessary.

Any commercially available welding wire can be used as the filler metal M. For example, a welding wire specified by solid wires for MAG and MIG welding of mild steel, high tensile strength steel, and low temperature service steel (JIS Z 3312), flux-cored wires for arc welding of mild steel, high tensile strength steel, and low temperature service steel (JIS Z 3313), or the like can be used. Further, it is also possible to use the filler metal M such as aluminum, an aluminum alloy, nickel, or a nickel-based alloy according to required properties.

The robot driving unit 21 drives the welding robot 17 to move the welding torch 15 and melts the continuously supplied filler metal M using the welding current and a welding voltage supplied from the welding power supply unit 25.

A manufacturing program corresponding to the manufacturing object to be produced is transmitted to the robot driving unit 21 from the control unit 13. The manufacturing program includes a large number of instruction codes and is created based on an appropriate algorithm according to various conditions such as shape data (CAD data or the like), material, and heat input amount of the manufacturing object.

The robot driving unit 21 executes the received manufacturing program, drives the welding robot 17, the filler metal supply unit 23, the welding power supply unit 25, and the like, and forms the weld bead according to the manufacturing program. That is, the robot driving unit 21 drives the welding robot 17 to move the welding torch 15 along a trajectory (bead formation trajectory) of the welding torch 15, which is set in the manufacturing program. At the same time, the robot driving unit 21 drives the filler metal supply unit 23 and the welding power supply unit 25 according to a welding condition instructed by the manufacturing program, and melts and solidifies the filler metal M at the tip of the welding torch 15 by the arc. As a result, the linear weld beads B are formed on the base metal 29 made of, for example, steel. The weld beads B form weld bead layers formed adjacent to each other, and a weld bead layer of the next layer is laminated on the weld bead layer, whereby a manufacturing object W having a desired three-dimensional shape is formed.

Here, the welding robot 17 is implemented by the articulated robot, and the manipulator moving the welding torch 15 is not limited thereto and may have other configurations as long as the manipulator is a mechanism that allows the welding torch 15 to move.

(Control Unit)

The control unit 13 determines a bead formation trajectory representing a formation order of the weld beads for manufacturing the manufacturing object according to input manufacturing conditions, and generates the manufacturing program described above. The control unit 13 includes an input unit 31 such as a keyboard, a mouse, and an operation panel, a display unit 33 such as a monitor and a display panel, and a computer (PC) 35 as a control unit main body to which the input unit 31 and the display unit 33 are connected.

Figure 2:
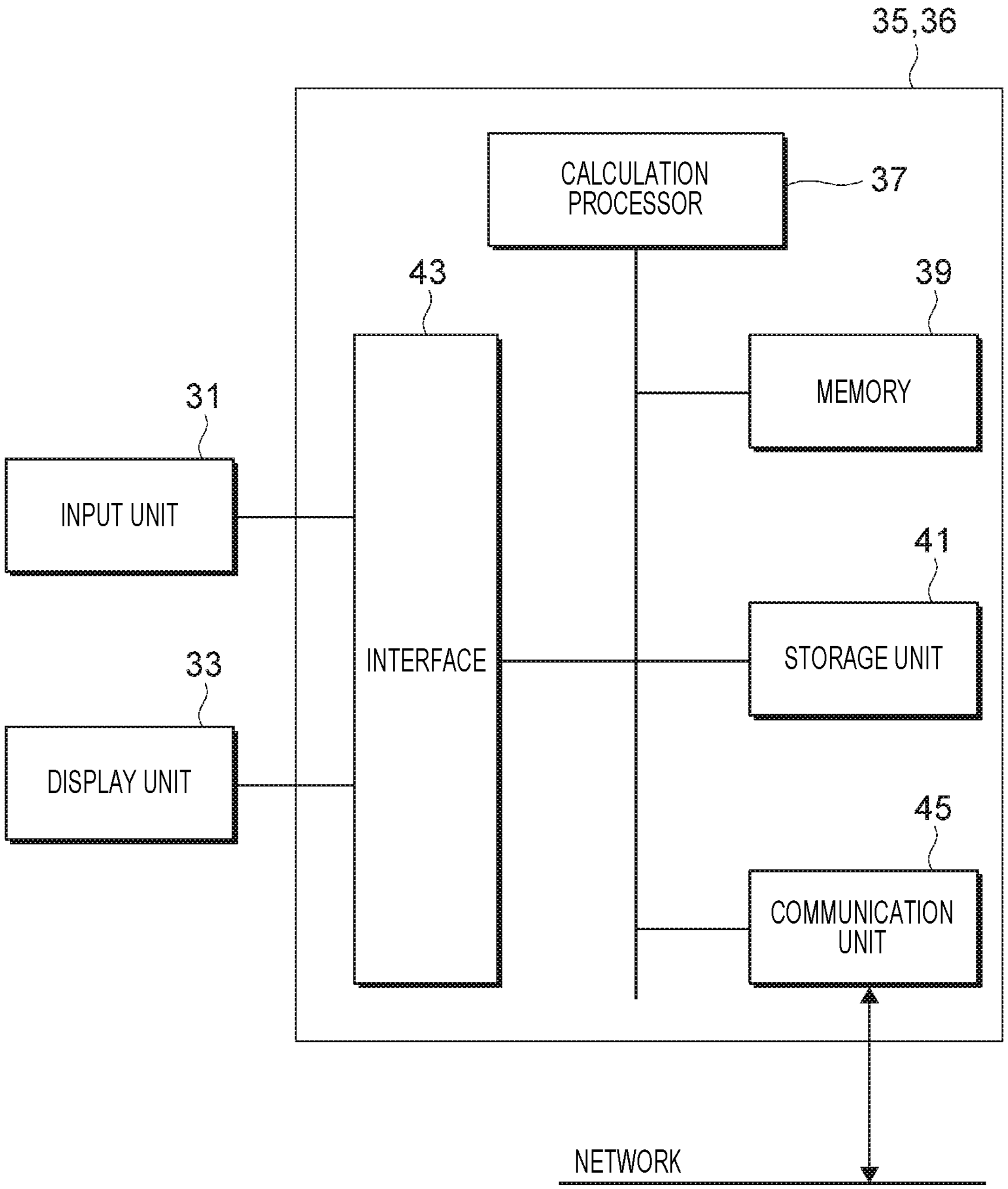
FIG. 2 is a schematic configuration diagram of a control unit.

FIG. 2 is a schematic configuration diagram of the control unit 13.

The PC 35 of the control unit 13 includes a calculation processor 37 such as a CPU or MPU, a memory 39 such as a ROM or RAM, and a storage unit 41 such as a hard disk drive (HD) or a solid state drive (SSD). The PC 35 further includes an interface 43 that inputs and outputs information between the input unit 31 and the display unit 33, and a communication unit 45 that connects to the network.

Further, the control unit 13 may be arranged separately from the manufacturing unit 11 and connected to the manufacturing unit 11 from a remote location via a communication method such as the network. Further, as illustrated in FIG. 1, another external control unit 13A arranged separately from the control unit 13 and including the input unit 31, the display unit 33, and an external PC 36 may be connected to the control unit 13 via a communication method such as the network. In addition to being created by the control unit 13, the manufacturing program may be created by another device such as the external PC 36, and input to the control unit 13 via communication or a storage medium.

Figure 3:
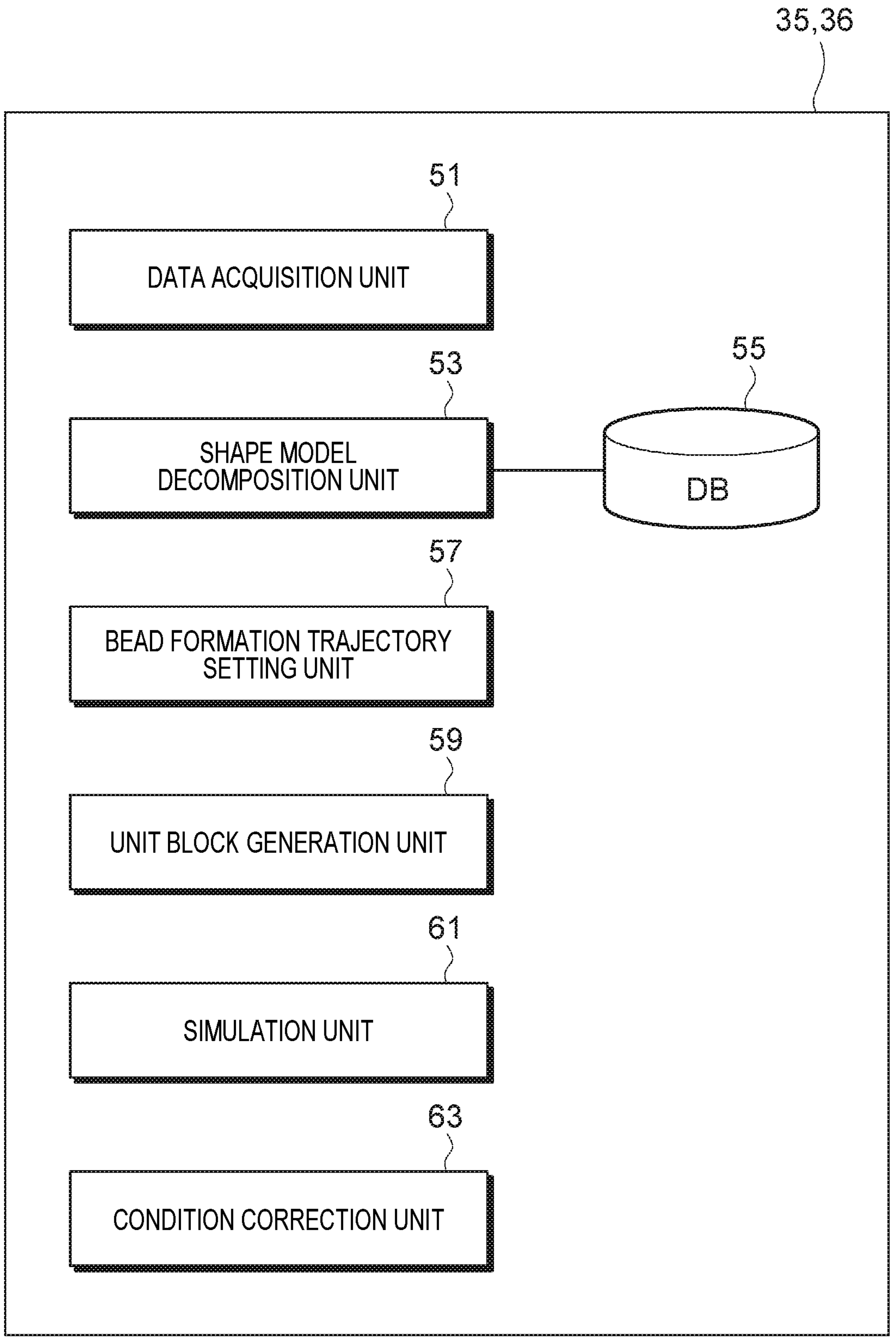
FIG. 3 is a schematic functional block diagram of the control unit.

FIG. 3 is a schematic functional block diagram of the control unit 13.

The PC 35 of the control unit 13 includes a data acquisition unit 51, a shape model decomposition unit 53, a database 55, a bead formation trajectory setting unit 57, a unit block generation unit 59, a simulation unit 61, and a condition correction unit 63, which will be described in detail later. Each component described above operates according to commands from the calculation processor 37 and performs respective functions.

The above-described configuration of the PC 35 is the same for the external PC 36 of the external control unit 13A, and the external PC 36 can perform the same functions. That is, the control unit 13 and the external control unit 13A function as a trajectory plan creation assistance device that assists creation of the bead formation trajectory, which will be described later. The trajectory plan creation assistance device is not limited to the form accompanying the additive manufacturing device 100 and may be provided at another position separately from the additive manufacturing device 100.

(Trajectory Plan Creation Assist and Generation of Manufacturing Program)

Next, a specific procedure for the control unit 13 (or external control unit 13A) to generate the manufacturing program will be described.

To manufacture the manufacturing object W, a trajectory plan such as the bead formation trajectory and welding conditions of the weld bead for manufacturing the shape of the manufacturing object W is input to the control unit 13, and the manufacturing program is created based on the trajectory plan. Here, failures such as defects in the weld bead and unreasonable welding conditions that may occur when the bead formation trajectory is obtained from the shape of the manufacturing object W and the weld bead is formed on the bead formation trajectory are analytically obtained. When a failure occurs in an analysis result, the trajectory plan is repeatedly corrected until the failure no longer occurs.

Figure 4:
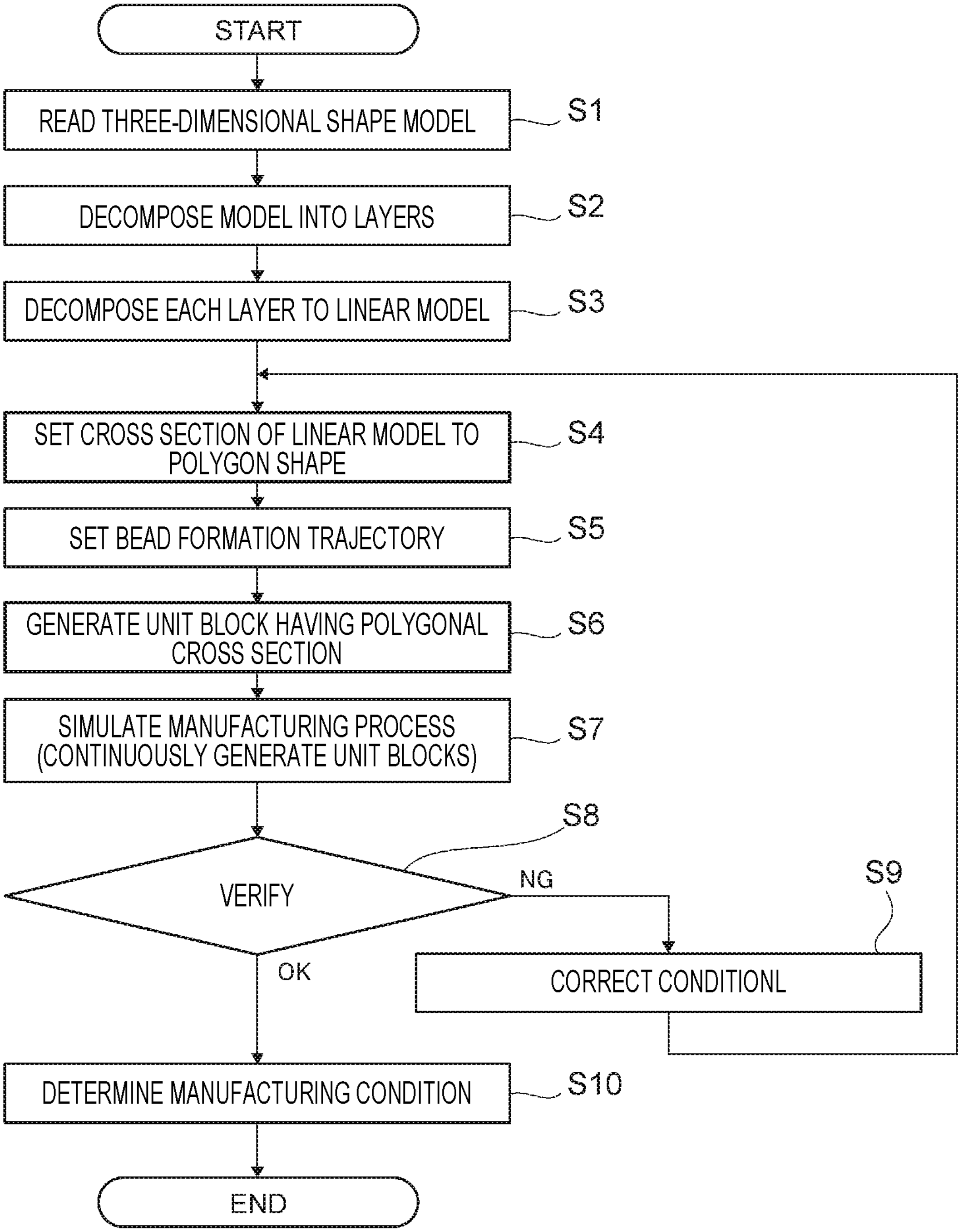
FIG. 4 is a flowchart illustrating a procedure for determining a trajectory plan when a manufacturing object is manufactured.

FIG. 4 is a flowchart illustrating a procedure for determining the trajectory plan when the manufacturing object W is manufactured. The procedure for determining the trajectory plan is also a procedure of a trajectory plan creation assistance method for determining the bead formation trajectory. Hereinafter, the procedure will be sequentially described based on the flowchart of FIG. 4.

(Data Acquisition)

First, an operator inputs physical property data of the manufacturing object to be manufactured, shape data (CAD data) representing a target shape, and information such as welding conditions corresponding to a device of the manufacturing unit 11 to be used to the PC 35 through the input unit 31 illustrated in FIGS. 1 and 2. Information on the base metal 29 may be included in the shape data.

(Shape Division Processing)

The data acquisition unit 51 of the PC 35 illustrated in FIG. 3 reads various types of input information (S1). The shape model decomposition unit 53 generates a three-dimensional shape model of the manufacturing object based on the read shape data and decomposes the three-dimensional shape model into layers according to a height of the weld bead (S2).

(A) to (C) of FIG. 5 are process explanatory diagrams illustrating a state in which the three-dimensional shape model of the manufacturing object W is decomposed into bead models in a stepwise manner. As illustrated in (A) of FIG. 5, the three-dimensional shape model Mw of the manufacturing object to be manufactured on the base metal 29 is sliced for each set bead height Hb of the weld bead, and the three-dimensional shape model Mw is decomposed into a plurality of (here, four layers) bead layers BL illustrated in (B) of FIG. 5. A layer division method is not limited thereto, and other known methods can also be used.

Then, each layer-decomposed bead layer BL is decomposed in accordance with a bead width Wb of the weld bead, and the three-dimensional shape model Mw is decomposed into a plurality of bead models (linear models) having a rectangular cross section (S3). For example, one bead model BM0 illustrated in (B) of FIG. 5 is a linear three-dimensional model that is continuous in a depth direction of FIG. 5 and imitates the weld bead. In the following description, a rectangular shape of a cross section orthogonal to a continuous longitudinal direction (depth direction) in the bead model BM0 is also referred to as a rectangular bead model BM0. During division of the rectangular bead model BM0, division conditions may be specified such that a bead cross-sectional area is made constant in a cross section orthogonal to a bead longitudinal direction for each model. Further, a bead stretching direction of the rectangular bead model BM0 described above may be extracted as information on the bead formation trajectory.

(Approximation of Cross-Sectional Shape to Polygon)

A plurality of bead models (linear models) represented by the bead model BM0 have a quadrilateral cross-sectional shape orthogonal to the bead longitudinal direction. The shape model decomposition unit 53 approximates the cross-sectional shape of the bead model to a polygon corresponding to the weld bead (S4).

Here, each bead model (linear model) corresponding to the three-dimensional shape model Mw is approximated to a trapezoid, which is a simple geometric shape. In the trapezoidal bead model BM, in a vertical cross section in the bead longitudinal direction, a bottom line BMa arranged on a base metal 29 side and a top line BMb facing the bottom line BMa in a bead lamination direction are parallel to each other. Further, a pair of side lines BMc and BMd that face each other in a bead arrangement direction in the bead layer BL have four vertices that are non-parallel to each other.

The trapezoidal shape described above can be set freely, but when a relation between the welding conditions and the bead shape is managed in the database 55 in advance, a shape corresponding to the conditions may be selected by referring to the database 55.

(Modeling of Base Metal)

The three-dimensional shape model Mw described above is a model of the manufacturing object to be manufactured on the base metal 29, and a model having a specific cross-sectional shape may be set for the base metal 29 as well. In that case, the three-dimensional shape model of the base metal 29 based on the shape data is set to a plurality of linear models whose vertical cross sections in the longitudinal direction are polygonal. In the present description, the bead model that models an area of the manufacturing object and the linear model that models an area of the base metal 29 are also referred to as "linear models". Further, the base metal 29 may be formed of the weld bead. In that case, the bead model corresponding to the weld bead is set as a linear model, as in the case of the manufacturing object.

FIG. 6 is a schematic view illustrating a shape and a dimension of the formed weld bead B.

The weld bead B often has a cross-sectional shape orthogonal to the bead formation direction that is approximately semicircular. For the weld bead B, a width of the weld bead B in the cross section orthogonal to the bead formation direction is defined as the bead width Wb, a height from a base of the bead formation to a top of the formed weld bead is defined as a bead height H, and an angle between a side wall of the weld bead B and a base surface is defined as an inclination angle θ. Further, a cross-sectional area in the vertical cross section of the weld bead B in the longitudinal direction is defined as a bead cross-sectional area A, and a volume per unit length of the weld bead is defined as a bead unit volume V.

A model shape is registered in the database 55 in association with a feature amount of the bead shape described above. For example, in the case of a model having a trapezoid cross-sectional shape, various parameters such as each length of the bottom line, the top line, and the side line and the angle formed by the bottom line and the side line are determined with reference to the database 55. At this time, the trapezoidal shape may be changed as appropriate, such as moving a vertex of a trapezoid in consideration of overlapping adjacent beads.

The approximate polygon is a simple shape in which the number of interior angles is three or more and eight or less. That is, examples of the polygon include a triangle (such as an isosceles triangle and a right triangle), a quadrilateral (such as a trapezoid, a parallelogram, a rectangle, and a square), a pentagon, a hexagon, a heptagon, and an octagon.

On the other hand, the linear model of the base metal 29 may have a polygonal shape similar to the above-described bead model and preferably has a polygonal cross-sectional shape having eight or more vertices.

FIG. 7 is an explanatory diagram illustrating a case where the model of the base metal 29 is a linear model PM having a cross-sectional shape different from that of the manufactured body. Here, the linear model PM whose cross-sectional shape is octagonal is illustrated. When the cross-sectional shape of the linear model PM of the base metal 29 is a polygon having an octagonal shape or more, a gap is less likely to occur between the linear models PM even when the base metal 29 is curved, and a following capability of the base metal 29 to the curve becomes favorable.

When the shape of the base metal 29 is reproduced by connecting polyhedron models, it is possible to more easily express how first-layer weld beads are arranged and connected on the base metal 29. That is, based on contact points of the polyhedron model corresponding to the base metal 29, the lamination direction can be expressed relatively easily. The polyhedron model used for the base metal 29 can be, for example, a decahedron having a predetermined thickness in one direction and an octagonal cross section, and in that case, the contact points with the bead model on the manufacturing object side can be easily specified. By doing so, it becomes easier to avoid bugs such as the bead model being unnaturally buried or floating in the base metal 29. The cross section of the polyhedron model forming part of the base metal 29 is not limited to an octagon, and other polygons may be used. Further, the shape of the base metal 29 per se is not particularly limited, and the base metal 29 may be a cylindrical base material or a prismatic base metal.

The bead formation trajectory setting unit 57 illustrated in FIG. 3 sets a bead formation locus on which the weld bead is formed along the bead model (linear model) corresponding to the manufacturing object and the bead formation trajectory including a lamination order of the weld bead (S5). The bead formation trajectory may be set according to a known algorithm prepared in advance.

(Unit Block)

Next, the unit block generation unit 59 illustrated in FIG. 3 converts the bead model BM of the manufacturing object and the linear model PM of the base metal 29 into a unit block that becomes a model used for simulation (S6).

FIGS. 8A and 8B are diagrams illustrating the unit block based on the trapezoidal bead model BM, in which FIG. 8A is an explanatory diagram illustrating a cross section of the unit block and FIG. 8B is an explanatory diagram illustrating the unit block along the bead formation locus. Here, the cross-sectional shape of the bead model BM approximates to a trapezoid.

FIG. 8A illustrates shapes of two bead models BM1 and BM2 arranged in parallel with each other on a plane PL perpendicular to the bead formation direction. One bead model BM1 is a trapezoid having vertices at P1, P2, P3, and P4, and the other bead model BM2 is a trapezoid having vertices at P4, P5, P6, and P7.

As illustrated in FIG. 8B, the bead model BM1 is arranged along a bead formation trajectory PS1, which is the bead longitudinal direction, and the bead model BM2 is arranged along a bead formation trajectory PS2. By stretching the bead model BM1 forward and backward along the bead formation trajectory PS1, bead models BM1*a* and BM1*b* corresponding to the bead model BM1 are generated. The bead model BM1*a* is a trapezoid having vertices at P1*a*, P2*a*, P3*a*, and P4*a*, and the bead model BM1*b* is a trapezoid having vertices at P1*b*, P2*b*, P3*b*, and P4*b*.

A solid formed by connecting corresponding vertices of the bead models BM1*a* and BM1*b* is defined as a unit block UBa. The unit block UB1 is a columnar body of a trapezoidal cross section having vertices at P1*a*, P2*a*, P3*a*, P4*a*, P1*b*, P2*b*, P3*b*, and P4*b*.

Similarly, in the bead model BM2, a solid formed by connecting corresponding vertices of the bead models BM2*a* and BM2*b* is defined as a unit block UBb. The unit block UBb is a columnar body of a trapezoidal cross section having vertices at P4*a*, P5*a*, P6*a*, P7*a*, P4*b*, P5*b*, P6*b*, and P7*b*.

In this way, the unit block generation unit 59 generates the unit blocks UBa and UBb by giving the bead models approximated to a polygon a thickness. Then, by continuously connecting the unit blocks UBa and UBb along the trajectory of each path, a three-dimensional shape of the weld bead is reproduced. That is, the three-dimensional shape model Mw, which is a target shape of the manufacturing object, is represented by the plurality of unit blocks UBa and UBb. Here, the unit blocks are the unit blocks UBa and UBb of the columnar body having a trapezoidal cross section, but the shapes of the unit blocks UBa and UBb are not limited to a hexahedron, and may be a pentahedron, a heptahedron, an octahedron, a nonahedron, a decahedron, or the like.

Depth distances (thicknesses along the bead formation trajectories PS1 and PS2) of the unit blocks UBa and UBb can be adjusted as appropriate. When the depth distance is set to a constant distance (constant thickness), the unit block can be easily generated, and calculation is also reduced. The larger the depth distance is, the more the calculation is reduced, but a reproducibility of the shape of the manufacturing object decreases. The smaller the depth distance, the better the reproducibility of the shape of the manufacturing object, but the number of blocks increases, and a calculation load for model generation increases. Therefore, the thickness of the unit block may be set in an appropriate balance according to a purpose. Volumes of the unit blocks UBa and UBb may be adjusted in accordance with a feeding speed and a travel speed of the filler metal. In addition, the volumes (or cross-sectional areas) of the unit blocks UBa and UBb may be increased or decreased according to an increase or decrease in the travel speed during the path and the feeding speed of the filler metal, or a size of the polygon (for example, a trapezoid) may be increased or decreased according to shapes of the start part and the end part of the weld bead.

The bead formation trajectories PS1 and PS2 may be set from the bead formation trajectory included in a predetermined trajectory plan or may be set from the information on the bead formation trajectory extracted from the direction in which the bead of the rectangular bead model BM0 illustrated in FIG. 5 is stretched.

FIG. 9 is an explanatory diagram illustrating the shapes of various unit blocks and application locations thereof. Here, an xy plane is a plate surface of the base metal 29 shown in FIG. 1, and a z direction is a vertical direction. An arrangement direction SD of the unit blocks to be applied is also illustrated.

The unit blocks UBa and UBb illustrated in FIG. 8B correspond to the unit block UB1 illustrated in FIG. 9. On the xy plane along the bead formation trajectories PS1 and PS2 illustrated in FIG. 8B, the unit block UB1 has a shape suitable for application to the linear arrangement direction SD.

A unit block UB2 illustrated in FIG. 9 has a shape suitable for application to the arrangement direction SD curved on the xy plane.

FIG. 10 is a schematic diagram illustrating a state in which the unit blocks UB2 are arranged.

In the unit block UB2, trapezoids facing each other are not parallel to each other, and, one oblique side of the trapezoid is thin, and the other oblique side is thick. Therefore, when a plurality of unit blocks UB2 are arranged with their trapezoidal surfaces overlapping each other, the unit blocks UB2 are arranged along the curved arrangement direction SD. Thus, an appropriate shape of the unit block is selected by changing one of a length of a block side of the unit block and the number of the interior angles of the polygon in accordance with the arrangement direction SD which is the bead formation trajectory set in the manufacturing plan. That is, a thickness in a direction along the bead formation trajectory of the unit block UB2 is set to a thickness in accordance with a curvature of the bead formation trajectory. According to this, it is possible to prevent occurrence of unnatural gaps or overlaps at locations where the unit blocks UB2 are connected to one another.

A unit block UB3 illustrated in FIG. 9 is a pentahedron in which a bottom surface and a top surface are triangles and side surfaces are trapezoid and quadrilateral. Therefore, when a plurality of unit blocks UB3 are arranged with their trapezoidal surfaces overlapping each other, the unit blocks UB3 are arranged along the bent arrangement direction SD.

A unit block UB4 is a hexahedron in which all side surfaces are trapezoid and a bottom surface and a top surface are rectangular. Since the top surface has a smaller area than the bottom surface, the side surfaces are inclined inward. Therefore, when a plurality of unit blocks UB4 are arranged such that any trapezoidal surfaces overlap each other, the unit blocks UB4 are arranged along the upwardly curved arrangement direction SD.

A unit block UB5 is a pentahedron in which a bottom surface is rectangular and side surfaces are trapezoid and triangle. In this case, when a plurality of unit blocks UB5 are arranged with their trapezoidal surfaces or triangle surfaces overlapping each other, the unit blocks UB5 are arranged along the upwardly bent arrangement direction SD.

A unit block UB6 is a hexahedron in which a bottom surface and side surfaces are trapezoid. This shape can be expressed, for example, as a solid on a bottom surface side obtained by cutting a pyramid having a trapezoidal bottom surface in a plane in a predetermined direction. The shape of the unit block UB6 is suitable for application to a start part and an end part of a weld bead which is tapered or expanded.

FIG. 11 is a perspective view of a bead model illustrating a state in which the unit blocks UB6 are arranged at the start part or the end part of the weld bead. In an actually formed weld bead, the start part of the bead formation tends to be expanded, and the end part tends to be tapered. Rounded shapes that occur at the start part and the end part of the weld bead can be reproduced well by using the unit block UB6. Further, when a shape of a weld bead laminated on an upper stage is predicted, it is possible to prevent sharp changes in height due to a model shape from adversely affecting calculations. The shape of the narrowed unit block UB6 may be adjusted by adjusting parameters such as an angle of inclination of each surface, the thickness of the unit block UB6, and the like in accordance with a shape of the bead model adjacent to the unit block UB6 or may be different between a start part side and an end part side of the weld bead.

The above-described unit blocks are similarly set for the linear model PM of the base metal 29.

FIG. 12 is an explanatory diagram illustrating the unit blocks of the manufacturing object and the unit blocks of the base metal 29 and the linear model. As illustrated in FIG. 12, a plurality of unit blocks UB corresponding to the bead model BM described above are arranged in an area of the three-dimensional shape model Mw that becomes the manufacturing object, and a plurality of unit blocks UBp corresponding to the linear model PM are arranged in the area of the base metal 29.

The shape of each of the unit blocks is a columnar body in which a portion simulating the weld bead has at least a pair of opposing surfaces having a trapezoidal shape, and a portion simulating a part of the base metal 29 on which the weld bead is laminated is a columnar body having a polygon having eight or more vertexes on a pair of opposing surfaces.

(Simulation)

Next, the simulation unit 61 illustrated in FIG. 3 simulates a manufacturing process of the manufacturing object based on predetermined manufacturing conditions using the unit blocks of the above-described polyhedrons (the pentahedron, the hexahedron, and the like) (S7). Here, a plurality of unit blocks are arranged along the bead formation trajectory in a bead lamination order under the predetermined manufacturing conditions. A unit block group consisting of the plurality of arranged unit blocks is used as a shape model for the simulation. Although not illustrated, the unit blocks corresponding to the base metal 29 may also be simulation targets. In that case, results closer to reality will be obtained.

FIG. 13 is a schematic perspective view of the unit block UB illustrated as an example. FIG. 14 is a schematic perspective view illustrating a unit block group GUB in which the unit blocks UB are arranged along the bead lamination order and the bead formation trajectory. In the unit block group GUB illustrated in FIG. 14, the shape of the unit block is partially changed depending on a position of the weld bead.

In the unit block group GUB, unit blocks located at the uppermost layers and end portions are trapezoids, and other unit blocks are parallelograms. The unit block group GUB in this case has an outer wall formed of the end portions, and an inner portion surrounded by the outer wall is filled with the weld beads. In this way, the trapezoidal unit blocks are arranged at the end portions of a bead arrangement, and the parallelogram unit blocks are arranged on an inner side of the end portions, such that an oblique side of the trapezoid and an oblique side of the parallelogram are joined without a gap. Therefore, it is possible to set a shape model that is closer to the actual weld bead.

The simulation unit 61 obtains the unit block group GUB illustrated in FIG. 14 by simulation. In addition, the simulation unit 61 uses the unit block group GUB as the shape model to execute calculation processing based on the input manufacturing conditions, as necessary. In the simulation, a three-dimensional shape model is generated by arranging the unit blocks along a bead formation trajectory in a preset manufacturing process. The simulation unit 61 may use the generated shape model to execute various analyses such as stress analysis, thermal stress analysis, and strain distribution analysis based on the set trajectory plan. For each analysis, for example, a known method such as a finite element method (FEM) can be used.

According to this, since the calculation in the manufacturing process can be executed for each unit block, a calculation load can be greatly reduced. For example, although it is also possible to use a shape model of a continuous shape, which is densely mesh divided, in this case, the calculation load increases, and simulation of a manufacturing object having a large size cannot be executed due to hardware restrictions, or calculation time becomes tremendous. However, by simulating the weld bead B and the base metal 29 using a plurality of unit blocks having a simple shape, even a PC having a relatively low processing capacity can obtain a calculation result of the simulation at a sufficient processing speed without complicating the shape more than necessary.

Further, the plurality of unit blocks may be arranged along the bead formation trajectory so that adjacent unit blocks are in contact with each other, or a gap may be provided between the adjacent unit blocks. In that case, the total number of required unit blocks can be reduced, and the calculation load during the simulation can be reduced.

FIG. 15 is a schematic perspective view illustrating the unit block group GUB in which the unit blocks UB are arranged along the bead lamination order and the bead formation trajectory. FIGS. 16A, 16B, and 16C are explanatory diagrams illustrating an arrangement order of the unit blocks in the unit block group GUB illustrated in FIG. 15 in stages.

In order to form the unit block group GUB illustrated in FIG. 15, first, the plurality of unit blocks UB are arranged along a bead formation trajectory PSa illustrated in FIG. 16A. Next, the plurality of unit blocks UB are arranged along a bead formation trajectory PSb illustrated in FIG. 16B. After that, the plurality of unit blocks UB are arranged along a bead formation trajectory PSc illustrated in FIG. 16C. At a position where the unit blocks UB three-dimensionally overlap one another, the unit block UB on an upper layer is placed on top of the unit block UB on a lower layer to maintain the shape of the unit block UB constant. That is, when the unit blocks are overlapped vertically, the unit blocks are simply overlapped without overlapping each other. Accordingly, it is possible to maintain a simple shape model without fusing the unit blocks (overlapping each other with a common portion). By doing so, even when the weld bead has a portion that intersects in multiple layers, the shape of the unit block UB remains constant, and an increase in the calculation load due to the simulation can be prevented. In addition, when the base metal has a curved surface shape, the gap between the unit blocks tends to become large when the unit blocks are fused together. In this case, it is preferable to fuse the unit blocks together to reduce the gap because it allows for a more realistic simulation.

A result of simulating the manufacturing process based on the above-described information on the unit blocks, the bead formation trajectory, and the bead lamination order may be a moving image in which the unit blocks are continuously generated along the bead formation trajectory with a passage of time. By displaying the moving image on the display unit 33 illustrated in FIG. 2, it is possible to make the operator visually recognize the manufacturing process of the weld beads. This simulation may be executed in all steps from the start of manufacturing to the end of manufacturing or may be executed only in a part of the steps.

(Verification and Condition Correction)

The simulation of the manufacturing process three-dimensionally reproduces shapes at various positions such as the start part and the end part of the bead, a corner portion, and the like when forming the manufacturing object by the weld beads. Therefore, it can be easily determined whether conditions such as bead formation trajectory are appropriate. Therefore, the result of the simulation described above is verified to verify whether the trajectory condition is appropriate (S8).

FIG. 17 is a cross-sectional view taken along line XVII-XVII of the unit block group GUB illustrated in FIG. 15. FIG. 18 is a cross-sectional view taken along line XVIII-XVIII of the unit block group GUB illustrated in FIG. 15.

In a block cut surface illustrated in FIG. 17, no particularly conspicuous narrow portion occurs, but in a block cut surface illustrated in FIG. 18, a narrow portion 71 occurs between a unit block UBc and a unit block UBd. The narrow portion 71 can be detected by extracting a portion where surfaces of adjacent unit blocks intersect with each other at an angle less than a predetermined limit angle. In the narrow portion 71, slag tends to accumulate during the formation of a weld bead, and there is a possibility that welding defects may occur.

Here, as a result of the verification, when a failure such as the occurrence of such a narrow portion 71 is found to occur, the condition correction unit 63 illustrated in FIG. 2 corrects the manufacturing conditions such as the travel speed, the feeding speed of the filler metal, the bead formation trajectory, the lamination order, and the like as necessary so as to prevent the occurrence of the failure (S9). Thereafter, the process returns to step S4 (FIG. 4) in which the cross section of the linear model is again converted into a polygon, and the series of processing up to the execution of the simulation is repeated.

The generated unit block group GUB may be compared with the model shape acquired by the data acquisition unit 51 illustrated in FIG. 3 to verify whether there is insufficient extra thickness or excessive welded portions. Alternatively, as illustrated in FIG. 14, the unit block group GUB may be cut in a cross section in any direction to generate block cut surface information, and a suitability of a positional relation of each path on the block cut surface may be checked. By doing so, it is possible to verify a positional relation of weld beads that overlap each other and whether there is a gap between the adjacent weld beads.

When the result of the simulation is verified and it can be confirmed that no failure occurs, the conditions of the trajectory plan in which the simulation is executed are determined as the trajectory plan (S10). Actual manufacturing of the manufacturing object is performed by creating a driving program based on the determined trajectory plan and executing the created driving program.

<Smoothing of Arrangement of Unit Model>

FIGS. 19A and 19B are diagrams illustrating a difference in an arrangement form of the plurality of unit blocks, in which FIG. 19A is an explanatory diagram illustrating an arrangement form having a step and FIG. 19B is an explanatory diagram illustrating a smoothed arrangement form.

In a case where the plurality of unit blocks are arranged along a continuous bead formation locus (path PS), as illustrated in FIG. 19A, when an existing unit block UBs exists in the lower layer in a height direction (z direction), a new unit block UB is arranged on the unit block UBs in the lower layer. In this case, a sharp step occurs in the unit block UB newly provided along the path PS. In this case, as illustrated in FIG. 19B, it is preferable to smooth a height position (target position) of the unit block UB and distribute a height change in the same path.

FIGS. 20A and 20B are diagrams illustrating a difference in an arrangement form of the plurality of unit blocks, in which FIG. 20A is an explanatory diagram illustrating an arrangement form having a step and FIG. 20B is an explanatory diagram illustrating a smoothed arrangement form.

As illustrated in FIG. 20A, when a unit block UBk1 and a unit block UBk2 along the path PS have different heights due to a difference in the travel speed or the like, a sharp step occurs at a boundary between the unit block UBk1 and the unit block UBk2. In this case, as illustrated in FIG. 20B, it is preferable to change a height of the unit block UBk3 near the boundary where the height changes in stages by changing the welding conditions (travel speed, etc.) to smooth a height from the unit block UBk1 to the unit block UBk2.

In this way, in the case where a sharp step occurs before and after each of the unit blocks along the path PS, by smoothing the unit blocks by adjusting the target position, the welding conditions, and the like of the unit blocks so as to be smoothly connected to one another, an apparent unnatural laminated shape can be pseudo to the bead shape conforming to an actual state.

<Form of Approximating Bead Model to Another Polygon>

Next, an example of a unit model in which the cross-sectional shape of the bead model (linear model) corresponding to the manufacturing object is approximated to a polygon other than a trapezoid to have a shape closer to an actual shape of the weld bead is described.

FIGS. 21A and 21B are diagrams illustrating a unit block based on a trapezoidal bead model and a pentagonal bead model, in which FIG. 21A is an explanatory diagram illustrating a cross section of the unit block and FIG. 21B is an explanatory diagram illustrating the unit block along the bead formation locus. FIGS. 21A and 21B are the same as those illustrated in FIGS. 8A and 8B except that a pentagonal bead model BM3 is used instead of the other trapezoidal bead model BM2 illustrated in FIGS. 8A and 8B and a heptahedral unit block UBc is used instead of the hexahedral unit block UBb.

The bead model BM3 illustrated in FIG. 21A assumes a case in which, after the weld bead corresponding to the bead model BM1 is formed, a new weld bead is formed along one side of the weld bead, and a model of the latter weld bead is the bead model BM3. The bead model BM3 has vertices P4, P5, P6, P7, and P8 and is provided in contact with a part (between the vertices P4 to P5) of the side surface on one side of the bead model BM1. The bead model BM3 has a shape closer to the actual weld bead.

As illustrated in FIG. 21B, by stretching the bead model BM3 forward and backward along the bead formation trajectory, the unit block UBc having P4*a*, P5*a*, P6*a*, P7*a*, P8*a*, P4*b*, P5*b*, P6*b*, P7*b*, and P8*b* as vertices is obtained. The unit block UBc is a columnar body having a pentagonal cross section.

FIGS. 22A and 22B are diagrams illustrating a division form of the unit block UBc illustrated in FIGS. 21A and 21B, in which FIG. 22A is a front view of the unit block Ubc and FIG. 22B is a perspective view of the unit block Ubc. The unit block UBc can be divided into a prismatic sub-unit block UBc1 and a triangular prism sub-unit block UBc2. By using the divided sub-unit blocks UBc1 and UBc2 individually as shape models for the simulation, the shape of the unit block can be simplified. Accordingly, the calculation load of the simulation can be reduced. A division pattern of the unit block is not limited thereto and may be another division form.

Figure 23B:
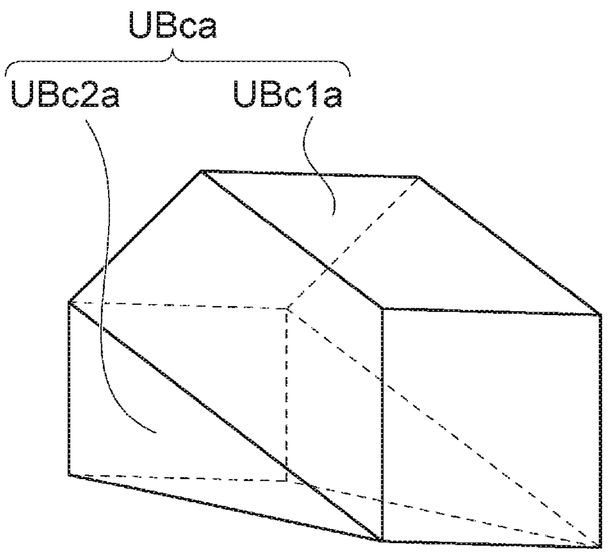

FIGS. 23A and 23B are diagrams illustrating a division form of another unit block UBca, in which FIG. 23A is a front view of the unit block Ubca and FIG. 23B is a perspective view of the unit block Ubca. The unit block UBca can be divided into a sub-unit block UBc1*a*, which is a prism having a trapezoidal cross section, and a sub-unit block UBc2*a*, which is a triangular prism having a right triangle cross section. The sub-unit block UBc1*a* has a simple shape in which base angles α of a pair of trapezoids are equal to each other. As described above, as compared with the sub-unit blocks UBc1 and UBc2 illustrated in FIGS. 22A and 22B, the sub-unit blocks UBc1*a* and UBc2*a* are more simplified in shape and can be expected to reduce the calculation load of the simulation at a point where the quadrilateral is a trapezoid having a symmetrical axis and a point where one corner of the triangle is a right angle. In this way, when the number of the interior angles of the polygon of the bead model is five, the cross-sectional shape of the bead model is divided into a trapezoid and a triangle, such that a unit block including a hexahedral sub-unit block and a pentahedral sub-unit block is generated.

FIGS. 24A and 24B are diagrams illustrating a division form of an octahedral unit block UBd, in which FIG. 24A is a front view of the unit block UBd and FIG. 24B is a perspective view of the unit block UBd.

The unit block UBd has a shape that can be applied to a weld bead having a large bead height and can be divided into a sub-unit block UBd1, which is a prism having a trapezoidal cross section, and a sub-unit block UBd2, which is a prism having a rectangular cross section.

FIGS. 25A and 25B are diagrams illustrating a division form of an octahedral unit block UBe, in which FIG. 25A is a front view of the unit block UBe and FIG. 25B is a perspective view of the unit block UBe.

The unit block UBe has a shape that can be applied to a weld bead having a nearly circular cross section and can be divided into sub-unit blocks UBe1 and UBe2, both of which are prisms each having a trapezoidal cross section.

FIGS. 26A and 26B are diagrams illustrating a division form of a unit block UBf having a dripping portion, in which FIG. 26A is a front view of the unit block UBf and FIG. 26B is a perspective view of the unit block UBf.

The dripping portion refers to a portion where a molten metal of the weld bead drips down toward the weld bead in the lower layer when the weld bead is formed.

The unit block UBf can be divided into a sub-unit block UBf1, which is a prism having a trapezoidal cross section, and two sub-unit blocks UBf2, each of which is a triangular prism having a triangle cross section provided at a base angle of the trapezoidal cross section on a lower surface of the sub-unit block UBf1. By the existence of the sub-unit block UBf2, a unit block having a more accurate volume can be set by subtracting a volume of the dripping portion of the weld bead from the sub-unit block UBf1 from a volume of the entire unit block UBf. Moreover, the shape of the actual weld bead can be approximated, and an accuracy of the simulation can be improved.

FIGS. 27A and 27B are diagrams illustrating a division form of a decahedral unit block UBg, in which FIG. 27A is a front view of the unit block UBg and FIG. 27B is a perspective view of the unit block UBg.

The unit block UBg has a shape that can be applied to a weld bead having a nearly circular cross section and can be divided into a sub-unit block UBg1, which is a prism having a trapezoidal cross section, a sub-unit block UBg2, which is a prism having a rectangular cross section, and a sub-unit block UBg3, which is a prism having a trapezoidal cross section.

As compared to the unit block UBe illustrated in FIGS. 25A and 25B, the unit block UBg can be applied to a weld bead having a larger volume because of including the sub-unit block UBg2.

In this way, when the number of the interior angles of the polygon of the bead model is six or more and eight or less, the cross-sectional shape of the bead model is divided into a trapezoid and a triangle or a trapezoid and a quadrilateral, such that a plurality of hexahedral unit blocks or a unit block including a plurality of hexahedral sub-unit blocks and a plurality of pentahedral sub-unit blocks is generated.

The number of the interior angles of the polygon of the bead model can be further increased.

FIGS. 28A and 28B are diagrams illustrating a division form of a unit block UBh having a dripping portion, in which FIG. 28A is a front view of the unit block UBh and FIG. 28B is a perspective view of the unit block UBh.

The unit block UBh can be divided into a sub-unit block UBh1, which is a prism having a trapezoidal cross section, two sub-unit blocks UBh2, each of which is a prism having a quadrilateral cross section provided at a base angle of the trapezoidal cross section on a lower surface of the sub-unit block UBh1, and two sub-unit blocks UBh3, each of which is a prism having a quadrilateral cross section and connected to a lower surface of the sub-unit block UBh2. According to this, a larger dripping portion can be set by the sub-unit blocks UBh2 and UBh3 compared to the unit block UBf illustrated in FIGS. 26A and 26B.

By using the unit blocks and the sub-unit blocks having such various shapes, a difference between the actual shape of the weld bead and the unit block is reduced, and the accuracy of the simulation can be further improved.

As described above, the shape model of the weld bead along the bead formation trajectory is determined by using the unit block of the simple shape imitating the weld bead, and a state of the manufacturing process is obtained by the simulation by using the shape model which is the unit block group including the plurality of unit blocks. Accordingly, it is possible to analytically extract a portion in which a defect such as a narrow portion may occur in the weld bead during the manufacturing without actually forming the weld bead. Then, the trajectory plan is corrected by adjusting various manufacturing conditions such as the bead formation trajectory and the welding conditions so as not to generate a portion in which a defect may occur. In this way, it is possible to easily create a trajectory plan capable of manufacturing a manufacturing object having a desired shape with high quality.

As described above, the present invention is not limited to the above-described embodiments, and combinations of the respective configurations of the embodiments and changes and applications made by those skilled in the art based on the description of the specification and well-known techniques are also intended for the present invention and are included in the scope of protection.

As described above, the present specification discloses the following matters.

(1) A trajectory plan creation assistance method for assisting creation of a trajectory plan, the trajectory plan including a bead formation trajectory for forming a weld bead when melting and solidifying a filler metal held by a manipulator while moving the filler metal by the manipulator to form the weld bead and laminating the formed weld bead to produce a manufacturing object, the method comprising:

- acquiring shape data of the manufacturing object;
- decomposing a three-dimensional shape model based on the shape data into a plurality of linear models each having a polygonal vertical cross section in a longitudinal direction;
- setting a bead formation locus for forming the weld bead along the linear model and the bead formation trajectory including a lamination order of the weld bead;
- generating a plurality of polygonal columnar unit blocks obtained by dividing the linear model into unit lengths along the set bead formation locus; and
- creating the trajectory plan by simulating the formation of the weld bead for each of the unit blocks by simulation.

According to the trajectory plan creation assistance method, by decomposing the three-dimensional shape model based on the acquired shape data into the plurality of linear models each having a polygonal cross-sectional shape, and dividing the linear models into the unit lengths along the bead formation locus, the plurality of polygonal columnar unit blocks are generated. By creating the trajectory plan by simulating the formation of the weld bead for each unit block by simulation, the manufacturing process of forming the manufacturing object can be realized in a simulated manner, and the trajectory plan can be easily verified from a simulation result.

(2) The trajectory plan creation assistance method according to (1), further including:

- receiving a correction condition for correcting the trajectory plan depending on a simulation result; and
- correcting the trajectory plan by repeatedly executing the simulation based on the correction condition.

According to the trajectory plan creation assistance method, the trajectory plan can be made closer to a more appropriate plan according to the simulation result. In addition, by repeatedly correcting the trajectory plan, an appropriate trajectory plan can be created more reliably.

(3) The trajectory plan creation assistance method according to (1) or (2), in which

- the unit block is a columnar body in which a portion simulating the weld bead has at least a pair of opposing surfaces having a trapezoidal shape, and a portion simulating a part of a base metal on which the weld bead is laminated is a columnar body having a polygon having eight or more vertexes on a pair of opposing surfaces.

According to the trajectory plan creation assistance method, the weld bead and base metal can all be reproduced in a simple shape. In addition, since the base metal has, on the surface thereof, a polygon having eight or more vertices, the positional relation and the contact point between the weld bead and the base metal can be easily specified even when the surface of the base metal has a curved surface such as a cylinder. Accordingly, the position of the unit block on the weld bead side can be easily defined based on the vertices, a center point, and the like of the polygonal shape of the unit block on a base metal side.

(4) The trajectory plan creation assistance method according to any one of (1) to (3), in which the unit block of a truncated polygonal pyramid having a bottom surface facing a bead formation direction is arranged on at least one of a start part and an end part of the bead formation locus.

According to the trajectory plan creation assistance method, the rounded shapes of the start part and the end part of the weld bead can be satisfactorily reproduced.

(5) The trajectory plan creation assistance method according to any one of (1) to (4), in which an outer shape of each of the plurality of unit blocks along the continuous bead formation locus is smoothed in accordance with a change in a formation condition or a lamination position of the weld bead.

According to the trajectory plan creation assistance method, the apparent unnatural step difference caused by polygonal approximation can be corrected, and the shape of the weld bead can be approximated as smooth and close to the actual shape.

(6) The trajectory plan creation assistance method according to any one of (1) and (5), in which a volume of the unit block is increased or decreased depending on a travel speed when forming the weld bead and a feeding speed of the filler metal.

According to the trajectory plan creation assistance method, since the volume of the unit block is adjusted in accordance with the travel speed and the feeding speed of the filler metal, the shape of the unit block can be made close to the shape of the actual weld bead even at the start part, the end part, and the corner portion of the bead.

(7) The trajectory plan creation assistance method according to any one of (1) to (6), in which when the polygonal columnar unit block is generated, at least one vertex of the polygonal column is moved according to an interval from a vertex of another linear model adjacent to the polygonal linear model.

According to the trajectory plan creation assistance method, even when the bead shape changes due to the overlapping of weld beads, a shape close to the actual weld bead can be reproduced.

(8) The trajectory plan creation assistance method according to any one of (1) to (7), in which in a cross section obtained by cutting a unit block group in which the plurality of unit blocks are arranged along the bead formation trajectory in any direction, block cut surface information representing a positional relation between a plurality of unit blocks overlapping one another is generated.

According to the trajectory plan creation assistance method, since the state of each unit block in the unit block group can be easily grasped from any cross section, errors in the trajectory plan can be encouraged to be corrected.

(9) The trajectory plan creation assistance method according to (8), in which the block cut surface information is displayed on a display unit.

According to the trajectory plan creation assistance method, the block cut surface information is displayed on the display unit, so that the operator can easily visually check the state of the unit block.

(10) The trajectory plan creation assistance method according to (8), in which a narrow portion in which surfaces of the unit blocks adjacent to each other intersect at an angle less than a predetermined limit angle is extracted from the block cut surface information.

According to the trajectory plan creation assistance method, by extracting narrow portions where defects are likely to occur, it is possible to provide the operator with an opportunity to predict the occurrence of defects and set conditions to prevent defects.

(11) The trajectory plan creation assistance method according to (10), in which the narrow portion is displayed on the display unit.

According to the trajectory plan creation assistance method, information on the narrow portion is displayed on the display unit, so that the operator can easily visually check the occurrence of the narrow portion.

(12) The trajectory plan creation assistance method according to any one of (1) to (11), in which at least one of a block side length of the unit block and the number of interior angles of the polygon is changed depending on a direction of the bead formation trajectory.

According to the trajectory plan creation assistance method, when the plurality of unit blocks are arranged, an arrangement direction of the unit blocks can be directed in a desired direction. Accordingly, the unit blocks can be easily arranged along the formation direction of the weld bead.

(13) The trajectory plan creation assistance method according to any one of (1) to (12), in which a shape of the unit block is made to have a constant thickness in the direction along the bead formation trajectory.

According to the trajectory plan creation assistance method, the shapes of the unit blocks are aligned to a constant thickness, and the unit blocks can be easily arranged.

(14) The trajectory plan creation assistance method according to any one of (1) to (12), in which a thickness of the unit block in the direction along the bead formation trajectory is made to have a thickness depending on a curvature of the bead formation trajectory.

According to the trajectory plan creation assistance method, it is possible to prevent occurrence of unnatural gaps or overlaps at locations where the unit blocks are connected to one another.

(15) The trajectory plan creation assistance method according to any one of (1) to (14), in which when the number of interior angles of the polygon is five, the cross-sectional shape of the linear model is divided into a trapezoid and a triangle, and the unit blocks including hexahedral sub-unit blocks and pentahedral sub-unit blocks are generated, and when the number of interior angles of the polygon is six or more and eight or less, the cross-sectional shape of the linear model is divided into a trapezoid and a triangle or a trapezoid and a quadrilateral, and the unit blocks including a plurality of hexahedral sub-unit blocks or a plurality of hexahedral sub-unit blocks and pentahedral sub-unit blocks are generated.

According to the trajectory plan creation assistance method, by further decomposing the cross-sectional shape of the linear model into a plurality of polygons, the shape of the unit block can be more simplified.

(16) The trajectory plan creation assistance method according to any one of (1) to (15), in which for a portion where the weld beads overlap vertically, the unit block in an upper layer is arranged on the unit block arranged in a lower layer without overlapping with the unit block in the lower layer.

According to the trajectory plan creation assistance method, when the unit blocks are overlapped vertically, the unit blocks are simply overlapped without overlapping each other. Accordingly, the simulation can be performed with a simple shape model without fusing the unit blocks.

(17) The trajectory plan creation assistance method according to any one of (1) to (16), in which for a portion where the weld beads overlap vertically, at least a part of the shape of the unit block in the upper layer has a dripping portion that drips down toward the unit block arranged in the lower layer.

According to the trajectory plan creation assistance method, it is possible to simulate the dripping of the molten metal at the time of forming the weld bead and to improve the accuracy of the simulation.

(18) The trajectory plan creation assistance method according to any one of (1) to (17), in which the plurality of unit blocks are arranged with a gap between adjacent unit blocks along the bead formation trajectory.

According to the trajectory plan creation assistance method, by providing the gap between the unit blocks, a total number of required unit blocks can be reduced, and the calculation load at the time of simulation can be reduced.

(19) An additive manufacturing method for forming the weld bead based on the trajectory plan determined by the trajectory plan creation assistance method according to any one of (1) to (18).

According to the additive manufacturing method, since the trajectory plan in which a manufacturing result can be predicted by the simulation is executed, the manufacturing can be performed under an appropriate condition in which the occurrence of the defects is prevented.

(20) A trajectory plan creation assistance device including:

a control unit that creates the trajectory plan by the trajectory plan creation assistance method according to any one of (1) to (18).

According to the trajectory plan creation assistance device, by decomposing the three-dimensional shape model based on the acquired shape data into the plurality of linear models each having a polygonal cross-sectional shape and dividing the linear models into the unit lengths along the bead formation locus, the plurality of polygonal columnar unit blocks are generated. By creating the trajectory plan by simulating the formation of the weld bead for each unit block by simulation, the manufacturing process of forming the manufacturing object can be realized in a simulated manner, and the trajectory plan can be easily verified from a simulation result.

(21) The trajectory plan creation assistance device according to claim 20 further including:

a condition correction unit that corrects the trajectory plan depending on the simulation result.

According to the trajectory plan creation assistance device, the trajectory plan can be made closer to a more appropriate plan according to the simulation result.

(22) An additive manufacturing device that forms the weld bead based on the trajectory plan determined by the trajectory plan creation assistance device according to (20) or (21).

According to the additive manufacturing device, since the trajectory plan in which the manufacturing result can be predicted by the simulation is executed, the manufacturing can be performed under an appropriate condition in which the occurrence of the defects is prevented.

(23) A program for executing procedures of a trajectory plan creation assistance method for assisting creation of a trajectory plan, the trajectory plan including a bead formation trajectory for forming a weld bead when melting and solidifying a filler metal held by a manipulator while moving the filler metal by the manipulator to form the weld bead and laminating the formed weld bead to produce a manufacturing object, the program causing a computer to execute a procedure of acquiring shape data of the manufacturing object;

a procedure of decomposing a three-dimensional shape model based on the shape data into a plurality of linear models each having a polygonal vertical cross section in a longitudinal direction;

a procedure of setting a bead formation locus for forming the weld bead along the linear model and the bead formation trajectory including a lamination order of the weld bead;

a procedure of generating a plurality of polygonal columnar unit blocks obtained by dividing the linear model into unit lengths along the set bead formation locus; and a procedure of creating the trajectory plan by simulating the formation of the weld bead for each of the unit blocks by simulation.

According to the program, by decomposing the three-dimensional shape model based on the acquired shape data into the plurality of linear models each having a polygonal cross-sectional shape and dividing the linear models into the unit lengths along the bead formation locus, the plurality of polygonal columnar unit blocks are generated. By creating the trajectory plan by simulating the formation of the weld bead for each unit block by simulation, the manufacturing process of forming the manufacturing object can be realized in a simulated manner, and the trajectory plan can be easily verified from a simulation result.

(24) A program that causes a computer to execute a procedure of correcting the trajectory plan created by the program according to (23) depending on the simulation result.

According to the program, the trajectory plan can be made closer to a more appropriate plan according to the simulation result.

The present application is based on Japanese Patent Application No. 2021-135179 filed on Aug. 20, 2021 and Japanese Patent Application No. 2022-041225 filed on Mar. 16, 2022, and contents of which are incorporated herein by reference.

REFERENCE SIGNS LIST

11: manufacturing unit
13: control unit
13A: external control unit
15: welding torch
17: welding robot
21: robot driving unit
23: filler metal supply unit
25: welding power supply unit
27: reel
29: base metal
31: input unit
33: display unit
35: PC 36: external PC
37: calculation processor
39: memory
41: storage unit
43: interface
45: communication unit
51: data acquisition unit
53: shape model decomposition unit
55: database
57: bead formation trajectory setting unit
59: unit block generation unit
61: simulation unit
63: condition correction unit
71: narrow portion
100: additive manufacturing device
B: weld bead
BL: bead layer
BM, BM0, BM1, BM1a, BM1b, BM2, BM2a, BM3: bead model (linear model)
BMa: bottom line
BMb: top line
BMc, BMd: side line
GUB: unit block group
H: bead height
Hb: bead height
M: filler metal (welding wire)
Mw: three-dimensional shape model
P1, P2, P3, P4, P5, P6, P7, P8: vertex
PL: plane
PM: linear model
PS1, PS2, PSa, PSb, PSc: bead formation trajectory
SD: arrangement direction
UB, UB1, UB2, UB3, UB4, UB5, UB6, UBa, UBb, UBc, UBca, UBd, UBe, UBf, UBg, UBh, UBp, UBk1, UBk2, UBk3: unit block
UBc1, UBc1a, UBc2, UBc2a, UBd1, UBd2, UBe1, UBe2, UBf1, UBf2, UBg1, UBg2, UBg3, UBh1, UBh2, UBh3: sub-unit block
W: manufacturing object
Wb: bead width
α: base angle
θ: inclination angle

The invention claimed is:

1. A trajectory plan creation assistance method for assisting creation of a trajectory plan, the trajectory plan including a bead formation trajectory for forming a weld bead when melting and solidifying a filler metal held by a manipulator while moving the filler metal by the manipulator to form the weld bead and laminating the formed weld bead to produce a manufacturing object, the method comprising:
acquiring shape data of the manufacturing object;
decomposing a three-dimensional shape model based on the shape data into a plurality of linear models each having a polygonal vertical cross section in a longitudinal direction;
setting a bead formation locus for forming the weld bead along the linear model and the bead formation trajectory including a lamination order of the weld bead;
generating a plurality of polygonal columnar unit blocks obtained by dividing the linear model into unit lengths along the set bead formation locus; and
creating the trajectory plan by simulating the formation of the weld bead for each of the unit blocks by simulation.

2. The trajectory plan creation assistance method according to claim 1, further comprising:
receiving a correction condition for correcting the trajectory plan depending on a simulation result; and
correcting the trajectory plan by repeatedly executing the simulation based on the correction condition.

3. The trajectory plan creation assistance method according to claim 1, wherein
the unit block is a columnar body in which a portion simulating the weld bead has at least a pair of opposing surfaces having a trapezoidal shape, and a portion simulating a part of a base metal on which the weld bead is laminated is a columnar body having a polygon having eight or more vertexes on a pair of opposing surfaces.

4. The trajectory plan creation assistance method according to claim 1, wherein
the unit block of a truncated polygonal pyramid having a bottom surface facing a bead formation direction is arranged on at least one of a start part and an end part of the bead formation locus.

5. The trajectory plan creation assistance method according to claim 1, wherein
an outer shape of each of the plurality of unit blocks along the continuous bead formation locus is smoothed in accordance with a change in a formation condition or a lamination position of the weld bead.

6. The trajectory plan creation assistance method according to claim 1, wherein
a volume of the unit block is increased or decreased depending on a travel speed when forming the weld bead and a feeding speed of the filler metal.

7. The trajectory plan creation assistance method according to claim 1, wherein
when the polygonal columnar unit block is generated, at least one vertex of the polygonal column is moved according to an interval from a vertex of another linear model adjacent to the polygonal linear model.

8. The trajectory plan creation assistance method according to claim 1, wherein
in a cross section obtained by cutting a unit block group in which the plurality of unit blocks are arranged along the bead formation trajectory in any direction, block cut surface information representing a positional relation between a plurality of unit blocks overlapping one another is generated.

9. The trajectory plan creation assistance method according to claim 8, wherein
the block cut surface information is displayed on a display unit.

10. The trajectory plan creation assistance method according to claim 8, wherein
a narrow portion in which surfaces of the unit blocks adjacent to each other intersect at an angle less than a predetermined limit angle is extracted from the block cut surface information.

11. The trajectory plan creation assistance method according to claim 10, wherein
the narrow portion is displayed on the display unit.

12. The trajectory plan creation assistance method according to claim 1, wherein
at least one of a block side length of the unit block and the number of interior angles of the polygon is changed depending on a direction of the bead formation trajectory.

13. The trajectory plan creation assistance method according to claim 1, wherein
a shape of the unit block is made to have a constant thickness in the direction along the bead formation trajectory.

14. The trajectory plan creation assistance method according to claim 1, wherein a thickness of the unit block in the direction along the bead formation trajectory is made to have a thickness depending on a curvature of the bead formation trajectory.

15. The trajectory plan creation assistance method according to claim 1, wherein when the number of interior angles of the polygon is five, the cross-sectional shape of the linear model is divided into a trapezoid and a triangle, and the unit blocks including hexahedral sub-unit blocks and pentahedral sub-unit blocks are generated, and when the number of interior angles of the polygon is six or more and eight or less, the cross-sectional shape of the linear model is divided into a trapezoid and a triangle or a trapezoid and a quadrilateral, and the unit blocks including a plurality of hexahedral sub-unit blocks or a plurality of hexahedral sub-unit blocks and pentahedral sub-unit blocks are generated.

16. A trajectory plan creation assistance device comprising:

a control unit configured to create the trajectory plan by the trajectory plan creation assistance method according to claim 1.

17. The trajectory plan creation assistance device according to claim 16 further comprising:

a condition correction unit configured to correct the trajectory plan depending on the simulation result.

18. An additive manufacturing device configured to form the weld bead based on the trajectory plan determined by the trajectory plan creation assistance device according to claim 16.

19. A non-transitory computer-readable recording medium storing a program for executing procedures of a trajectory plan creation assistance method for assisting creation of a trajectory plan, the trajectory plan including a bead formation trajectory for forming a weld bead when melting and solidifying a filler metal held by a manipulator while moving the filler metal by the manipulator to form the weld bead and laminating the formed weld bead to produce a manufacturing object, the program being configured to cause a computer to execute a procedure of acquiring shape data of the manufacturing object;

a procedure of decomposing a three-dimensional shape model based on the shape data into a plurality of linear models each having a polygonal vertical cross section in a longitudinal direction;

a procedure of setting a bead formation locus for forming the weld bead along the linear model and the bead formation trajectory including a lamination order of the weld bead;

a procedure of generating a plurality of polygonal columnar unit blocks obtained by dividing the linear model into unit lengths along the set bead formation locus; and a procedure of creating the trajectory plan by simulating the formation of the weld bead for each of the unit blocks by simulation.

20. A non-transitory computer-readable recording medium storing a program configured to cause a computer to execute a procedure of correcting the trajectory plan created by the program according to claim 19 depending on the simulation result.

* * * * *